US012495016B2

(12) United States Patent
Schnurr et al.

(10) Patent No.: US 12,495,016 B2
(45) Date of Patent: Dec. 9, 2025

(54) REAL-TIME APPLICATION EVENT DETECTION FOR CONTEXT-RICH NOTIFICATIONS AND COACHING

(71) Applicant: Verint Americas Inc., Alpharetta, GA (US)

(72) Inventors: Chris Schnurr, Londonderry (GB); Curtis Cunningham, Londonderry (GB); Chris O'Donnell, Greater Manchester (GB); Senan Burgess, Dublin (IE)

(73) Assignee: Verint Americas Inc., Alpharetta, GA (US)

( * ) Notice: Subject to any disclaimer, the term of this patent is extended or adjusted under 35 U.S.C. 154(b) by 0 days.

(21) Appl. No.: 18/215,319

(22) Filed: Jun. 28, 2023

(65) Prior Publication Data

US 2024/0007429 A1    Jan. 4, 2024

Related U.S. Application Data

(60) Provisional application No. 63/357,673, filed on Jul. 1, 2022.

(51) Int. Cl.
| | |
|---|---|
| *G06F 15/16* | (2006.01) |
| *H04L 9/40* | (2022.01) |
| *H04L 51/224* | (2022.01) |
| *H04L 69/22* | (2022.01) |

(52) U.S. Cl.
CPC .......... *H04L 51/224* (2022.05); *H04L 63/168* (2013.01); *H04L 69/22* (2013.01)

(58) Field of Classification Search
CPC ...... H04L 51/224; H04L 63/168; H04L 69/22

USPC ................ 709/206, 204, 203, 217
See application file for complete search history.

(56) References Cited

U.S. PATENT DOCUMENTS

| | | | |
|---|---|---|---|
| 8,549,629 B1 | 10/2013 | McCreesh et al. | |
| 8,782,668 B1 | 7/2014 | McCreesh et al. | |
| 10,579,742 B1* | 3/2020 | Fernandez | G10L 15/16 |
| 11,765,270 B1* | 9/2023 | Langley | H04L 65/4015 |
| | | | 379/265.09 |
| 2004/0054791 A1* | 3/2004 | Chakraborty | H04L 63/20 |
| | | | 709/219 |
| 2004/0128359 A1 | 7/2004 | Horvitz et al. | |
| 2010/0169067 A1* | 7/2010 | Basel | G06F 13/10 |
| | | | 703/21 |
| 2013/0091192 A1* | 4/2013 | Shafi | G06F 9/546 |
| | | | 709/204 |

(Continued)

FOREIGN PATENT DOCUMENTS

WO    2015184359 A2    12/2015

OTHER PUBLICATIONS

Extended European Search Report issued for Application No. 23167059.7, dated Aug. 25, 2023.

*Primary Examiner* — Kaylee J Huang
(74) *Attorney, Agent, or Firm* — Meunier Carlin & Curfman LLC

(57) ABSTRACT

A realtime contextual event notification system that ingests events as streams from any authorized entity applies rules to the event streams, determines a context of an end-user who is a recipient of a targeted notification, and provides notifications to the end-user in accordance with the context. The event streams may come from multiple sources and rules may be applied to provide realtime contextual information associated with the end-user.

22 Claims, 19 Drawing Sheets

(56) References Cited

U.S. PATENT DOCUMENTS

| | | | |
|---|---|---|---|
| 2013/0136253 A1* | 5/2013 | Liberman Ben-Ami | H04M 3/5191 379/265.09 |
| 2014/0208172 A1 | 7/2014 | Schnurr et al. | |
| 2014/0372544 A1* | 12/2014 | Wen | H04L 51/046 709/206 |
| 2018/0070152 A1* | 3/2018 | Yang | H04N 21/81 |
| 2019/0258825 A1* | 8/2019 | Krishnamurthy | H04M 3/205 |
| 2020/0358898 A1 | 11/2020 | Singer et al. | |
| 2021/0044547 A1* | 2/2021 | Bradley | H04L 51/02 |
| 2022/0182492 A1* | 6/2022 | Skinner | H04M 3/5232 |
| 2022/0366277 A1* | 11/2022 | DeFilippo | G06Q 30/016 |
| 2025/0219863 A1* | 7/2025 | Ploegert | G06F 16/212 |

\* cited by examiner

| 1 | Information |  | Default icon shown if iconID is zero or missing | do not show if in focus assist mode |
| 2 | Confirmation |  | Displayed as success or positive reinforcement | do not show if in focus assist mode |
| 3 | Error |  | Displayed for generic error | Always show |
| 4 | Warning |  | Displayed for generic warning | Always show |
| 5 | Question |  | Displayed for generic question | do not show if in focus assist mode |
| 6 | Overtalk |  | Detected over-talk / cross talk in conversation | Always show |
| 7 | Frustrated customer |  | Detected Unsatisfied customer | Always show |
| 8 | Satisfied customer |  | Detected satisfied customer | Always show |
| 9 | Escalation |  | Customer wishes to speak to manager | Always show |
| 10 | Latency |  | Customer has been on hold for long time - apologise for wait | Always show |

*FIG. 7*

| Title | Source | Description Text | New |
|---|---|---|---|
| Complaint | RTAA | Customer is complaining, exercise empathy | Complaint — Customer may be complaining, please consider exercising empathy. Accurate? 👎 👍 |
| Long time to respond | RTAA | Customer is on hold for too long, thank the customer for holding | Long time to respond — Customer is on hold for too long, thank the customer for holding. Accurate? 👎 👍 |
| Frustrated Customer | RTAA | Try to relate | Frustrated Customer — Try to relate. Accurate? 👎 👍 |
| Satisfied Customer | RTAA | Keep up the positive attitude | Satisfacted Customer — Keep up the positive attitude. Accurate? 👎 👍 |
| Use Positive Language | RTAA | Try a positive approach | Use Positive Language — Try a positive approach. Accurate? 👎 👍 |
| Escalation | RTAA | Seek manager assistance | Escalation — Customer is escalation, seek help from manager. Accurate? 👎 👍 |

*FIG. 8A*

| | | | |
|---|---|---|---|
| Over-talk | RTAA | Let the customer complete their sentence before responding | Interruption Let the customer complete his sentence before responding. Accurate? 👎 👍 |
| Hold time | Application Trigger | Customer is on hold for too long, thank the customer for holding | Future |
| DPA Info message | DPA | <defined by customer> Also buttons / links | Offer discount Customer is classified as VIP, offer discount to retain subscription. [button] [button] Helpful? 👎 👍 |
| DPA Error Message | DPA | <defined by customer> Also buttons / links | Error Something the agent did wrong, followed by instructions how to perform the task properly. Helpful? 👎 👍 |
| DPA warning Message | DPA | <defined by customer> Also buttons / links | DPA Warning Title Warning description, followed by instructions how to perform the task properly. Helpful? 👎 👍 |
| DPA Success Message | DPA | <defined by customer> Also buttons / links | DPA Success Title Action success description. Helpful? 👎 👍 |

*FIG. 8B*

```
1 wa-client-app/
2 ├── ...
3 ├── src/
4 │   ├── ...
5 │   ├── pages/
6 │   │   ├── CallMentoring.jsx - Screen where the user can receive mentoring messages
7 │   │   ├── NotFound.jsx - Not found Screen
8 │   │   └── index.js
9 │   ├── App.css - General app styles
10  │   ├── App.js - App Component
11  │   ├── UnauthenticatedApp.js - App for visitors
12  │   ├── AuthenticatedApp.js - App for loggedin users
13  │   └── index.js - Where the React SPA is loaded
14 ├── ...
```

*FIG. 16*

REAL-TIME APPLICATION EVENT DETECTION FOR CONTEXT-RICH NOTIFICATIONS AND COACHING

CROSS-REFERENCE TO RELATED APPLICATION

This application claims priority to U.S. Provisional Patent Application No. 63/357,673, filed Jul. 1, 2022 and entitled "REAL-TIME APPLICATION EVENT DETECTION FOR CONTEXT-RICH NOTIFICATIONS AND COACHING," the disclosure of which is incorporated herein by reference in its entirety.

FIELD

The present disclosure generally relates to event notification systems, and, more specifically, to an event notification system and methods that deliver context-rich notifications and automatic coaching to a user based on real-time speech and acoustic detection.

BACKGROUND

Event notification systems often manage singular events using an "if this, then that" paradigm to provide prompts to users. The notifications provided by conventional systems do not account for the context of the notification; that is, they are delivered without regard to the state of the recipient or the circumstances that generated the notification.

SUMMARY

One implementation of the present disclosure is a method of real-time application event notifications to a user during a communication between a first user and a second user. The method includes receiving, at an API gateway component, event messages from a source over a socket connection, the event messages comprising information relating to an application event of such as user interaction with an API or application during the communication; authenticating, by the API gateway component, the event messages using a token that is contained within a header; receiving, at a recorder management system, user interaction data from the source; processing, at a managed streaming component, the event messages and communication information messages to determine a context to generate event notifications, wherein the context is determined based on the application event; and communicating event notifications to a client management service that determines a target client to receive the event notifications.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

Other systems, methods, features, and/or advantages will be or may become apparent to one with skill in the art upon examination of the following drawings and detailed description. It is intended that all such additional systems, methods, features, and/or advantages be included within this description and be protected by the accompanying claims.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 7 illustrates example icons that may be used to convey event notifications, according to certain embodiments;

FIGS. 8A and 8B illustrate example notifications that may be presented in the user interface of a client application, according to certain embodiments;

FIG. 16 is an illustration of an example UI definition; and

DETAILED DESCRIPTION

Modern contact centers utilize omnichannel communications to connect customers with support agents over, e.g., e-mails, live chat, social media, Short Message Service (SMS) messaging, and support tickets, to create a seamless user experience. Transaction history of the customer interactions over the various channels is maintained by the contact center. For example, if a customer initiates a chat session, the information from the chat session is available to a live support agent should the customer decide to ask to speak with a support agent while chatting. Customer interactions within the contact center may be viewed as a system of many parallel streams of events occurring in real-time. On their own, each event stream only describes a small fraction of the activity within the overall system, but when combined in a fully scalable and resilient manner in accordance with the disclosure hereinbelow, complex business rules may be holistically applied to the system. Further, a context may be derived from each event stream in real-time. This derived context allows for complex decisions to be made, and the associated outcomes provided to, support agents to assist in decision making in order to achieve a desirable outcome to address a customer's purpose for contacting the contact center.

With remote work becoming increasingly common, coaching and training of remote workers has also posed unique challenges across many industries. Some technologies exist that provide remote and/or online coaching to workers, such as through notifications delivered to a worker's computer or workstation. However, many current approaches deliver said notifications in isolation. In other words, many current technologies do not account for contextual data when providing notifications to help coach workers. For example, when an event (e.g., a linguistic event, such as the use of a key word) is detected during a phone call between a worker and a customer, a single notification may be presented to the worker regardless of the state of the call or other events occurring at or around the same time.

Architecture Description

Figure 1:
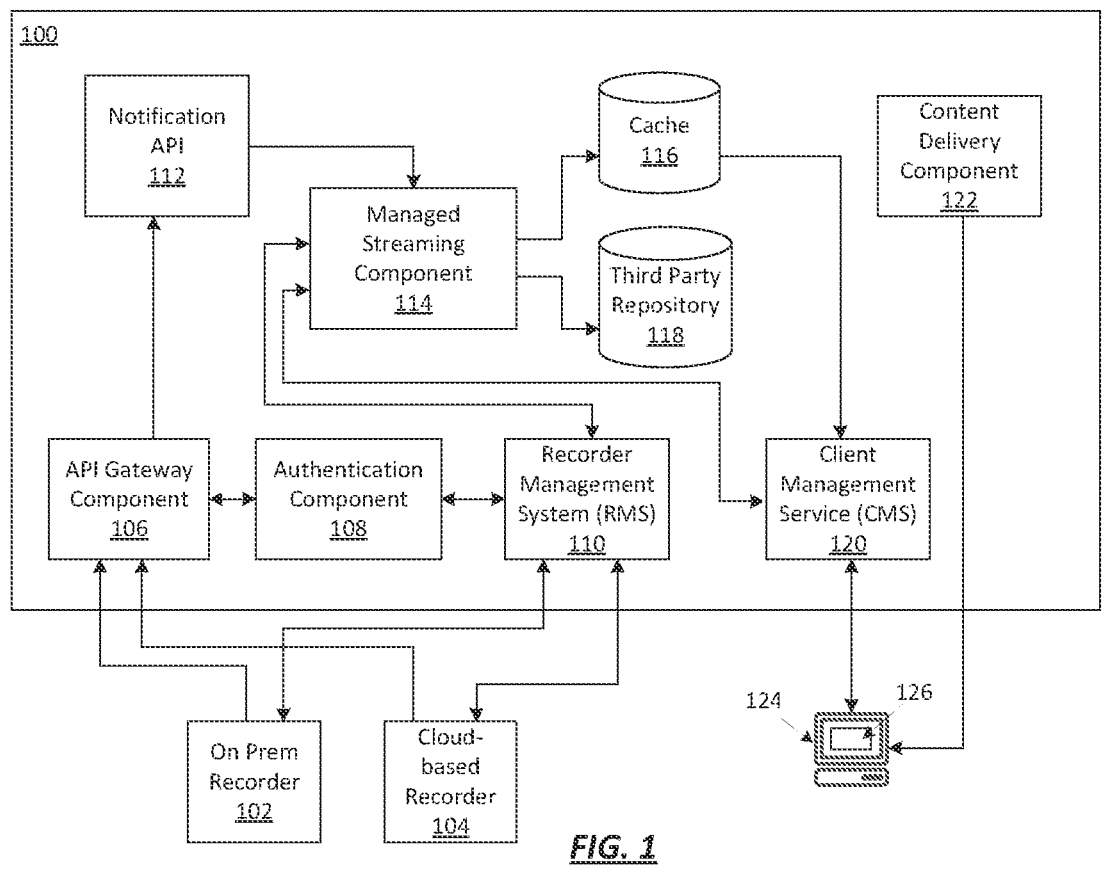
FIG. 1 illustrates an overview of the components of the real-time contextual event notification system, according to certain embodiments.

Referring to FIG. 1, there is illustrated an overview of a real-time contextual event notification system 100, its components, services, and processes according to certain embodiments. In an implementation, the real-time contextual event notification system 100 is a cloud-based real-time messaging system that ingests events as streams from any authorized entity, determines a context of a support agent and provides notifications to the support agent in accordance with the context data. The event streams may come from multiple sources, and rules may be applied to provide real-time contextual event notifications that are event notifications associated with a condition or state of a user and a circumstance that generated the notification (for example, a support agent), such as, "only show this message when the user is no longer on a phone call," "wait until the user stops editing this document before showing the next message," or "only show this information when the user starts speaking to a customer and they open a particular sub-menu and the customer has mentioned a particular key word."

Sources of events provided to the real-time contextual event notification system 100, may include on-premise servers such as a recorder integration server 102 and/or cloud-centric servers (for example, a cloud-based recorder 104). The recorder integration server 102 and/or cloud-based recorder 104 may capture audio and screen activity associated with interactions between the customer and the support agent. "Interactions" may include, for example, audio interactions (e.g., phone calls) but may also, more broadly, include other types of interactions, such as a chat, emails, text messages, etc. The audio and screen activity may be recorded so that it can be evaluated according to business needs. In an implementation, events may be messaged to the real-time contextual event notification system 100 in accordance with rules applied at the source to the captured activity to provide linguistic events and application events.

Linguistic events are determined, for example, from speech-to-text transcripts of the audio conversation(s) conducted between customers and support agents. Specifically, in some embodiments, recorder integration server 102 and/or cloud-based recorder 104 record audio (e.g., a phone call or other audio conversation) and convert the recorded audio into a transcript using any suitable speech-to-text algorithm. Alternatively, audio may be received from another device and transcribed by recorder integration server 102 and/or cloud-based recorder 104. Recorder integration server 102 and/or cloud-based recorder 104 can then analyze the audio transcript(s) using a real-time analytics framework (see FIG. 2) to identify the grouping and organization of the words and phrases spoken during calls that meet certain classification criteria. The analysis may identify themes that reveal trends and areas of opportunity or concern. Further discussion of linguistic and/or acoustic event detection is provided below with respect to FIG. 15.

Application events are determined, for example, as a customer or support agent interacts with a user interface. For example, a user interface component (not shown) may capture keystrokes, mouse clicks, screen touches, data submissions, etc. Alternatively, recorder integration server 102 and/or cloud-based recorder 104 may capture user interactions with the user interface and/or other events relating to applications on a user's workstation (e.g., a customer or support agent's computing device). Each interaction with the user interface may be considered an application event and the real-time analytics framework may use this information to determine how the customer and/or agent is interacting with an application presented in the user interface. In some embodiments, recorder integration server 102 and/or cloud-based recorder 104 detect or otherwise determine application events, as described herein.

In an implementation, the rules are distributed among the various connected sources. For example, multiple workstations or computing devices (e.g., each associated with a customer service agent), and/or multiple of recorder integration server 102 and/or cloud-based recorder 104, may be communicably coupled to real-time contextual event notification system 100 and may each apply a unique set of rules for detecting linguistic and/or application events, which are then evaluated by real-time contextual event notification system 100 to generate contextual event notifications. In another implantation, the rules may be centralized within the real-time contextual event notification system 100 and applied to the event messages that are received from various sources. A hybrid approach may also be used where rules are applied at the source(s) and at the real-time contextual event notification system 100.

A recorder management system (RMS) 110 serves as an endpoint to which the recorder integration server 102 and/or cloud-based recorder 104 interface over, for example, a socket connection. The RMS 110 manages the connections of the recorder integration servers 102 and/or cloud-based recorder 104, and, together with an authentication component 108, may authenticate incoming connections, process incoming messages, validate the schema of an incoming message, and validate the data passed in the message by adding a token to each message. The authentication component 108 uses a Daemon Flow authentication mechanism to enable the socket to be connected irrespective of the location of the recorder (i.e., on-prem or in the cloud). The RMS 110 may receive interaction and analytics events from the recorder integration server 102 and/or cloud-based recorder 104 that are used to, for example, determine the context of an interaction between the customer and the agent.

In operation, the recorder integration server 102 and/or cloud-based recorder 104 communicate with an API gateway component 106 that accepts a real-time events stream as event messages over a socket connection from the recorder integration server 102 and/or cloud-based recorder 104. The event messages include the token provided by the authentication component 108. Authenticated event messages are forwarded from the API gateway component 106 to a notification API 112 that provides a RESTful API to connect the event messages to a managed streaming component 114. In particular, received event messages are added to an event bus of the managed streaming component 114 and organized by topic.

The managed streaming component 114 provides services to publish (write) and subscribe to (read) streams of events, including continuous import/export of data from other systems. The managed streaming component 114 stores streams of events into a cache 116 or third-party repository 118. The managed streaming component 114 may process event streams as they occur (i.e., in real-time) or retrospectively. An example managed streaming component 114 is Apache KAFKA. The managed streaming component 114 processes the received event streams by organizing the events contained therein by raw topic, for example, a category of interest by which event message data is stored and published. The managed streaming component 114 uses information contained in call event messages provided by the RMS 110 to determine a current state of a call associated with an event stream. The call state information is provided by the recorder integration server 102 and/or cloud-based recorder 104 to the RMS 110 during a call between the customer and the support agent. The managed streaming component 114 stores the most current event of the call(s) and event streams (event message data and call event message data) to the cache 116 by topic for consumption by a client management service (CMS) 120 for delivery to a client 124 (and/or clients as described below as 124a, 124b, 124n).

The CMS 120 is an API designed to wrap around Socket.IO for the handling of commands to interact with the system 100 and to receive/send events. The CMS 120 provides a flexible interface to allow third parties to the system 100 to implement their own event client application. API calls to the CMS 120 are suitably generic in that they can be extended without the need to redistribute entire new package versions. According to certain embodiments, this package may be written in JavaScript, and in other embodiments, the package may be written in Dart, CoffeeScript, TypeScript, ELM, Kotlin, ClojurScript, or other web development language capable of encoding one or more features described herein A content delivery component 122 is provided to create a user interface to be presented on a client 124. The content delivery component 122 may be provided as JavaScript libraries that are interpreted by a plugin on a client application 126 (for example, a browser) executing on the client 124 to render the user interface. The client application may be cross-platform to enable easy distribution to any client 124. Target users connect to the real-time contextual event notification system 100 via a web application hosted in a native browser or desktop electron application.

With the introduction above of the various components within the real-time contextual event notification system 100, each will now be described in greater detail with reference to FIGS. 2-9.

Recorder Integration Server/Cloud-Based Recorder

Figure 2:
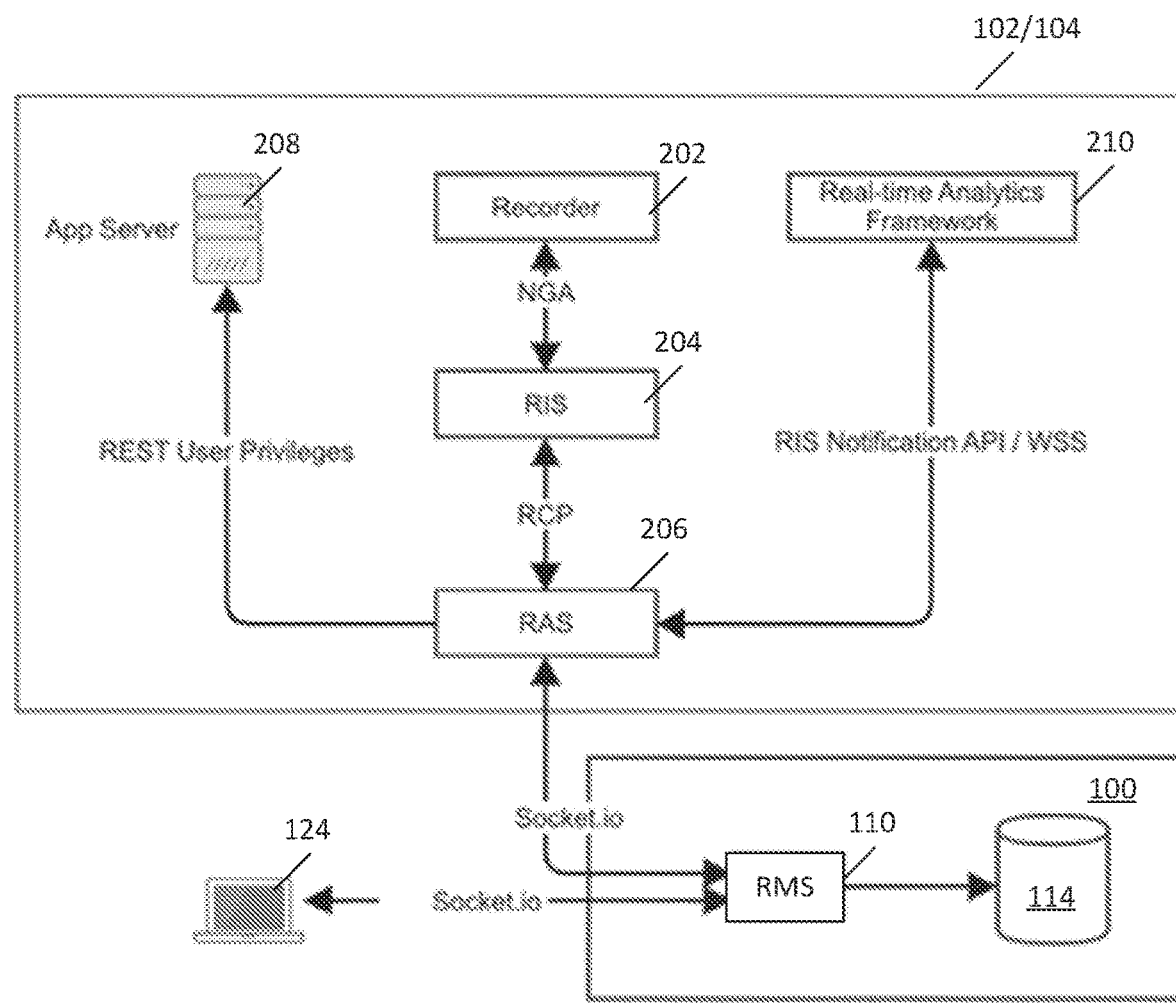
FIG. 2 illustrates additional details of the recorder integration server and cloud-based recorder and a call event API that is utilized to convey event data, according to certain embodiments.

With reference to FIG. 2, there are illustrated additional details of the recorder integration server 102 and cloud-based recorder 104 according to certain embodiments. A call event socket connection is utilized to convey event data from the recorder integration server 102 and cloud-based recorder 104 to the RMS 110. The call event Web socket is connected to the RMS 110 and receives an event stream from a Recorder Integration Server (RIS) 204 residing within the recorder integration server 102 and/or cloud-based recorder 104. This event stream is added to the real-time contextual event notification system 100 to allow for context provided by a call recorder 202 to be used to influence notifications provided to an agent and client interface states.

In operation, as a customer conducts a voice communication session with an agent, the call recorder 202 records audio and screen interaction data to enable search, replay, and report on calls by topic. The call recorder 202 communicates with the RIS server 204 as it records the calls and screens data. The RIS server 204 communicates to a Recording Archive Service (RAS) 206, which creates a socket connection to the RMS 110 to make the call event API call and pass event data to the system 100. The call event API is bidirectional to enable feedback and control of the RIS server 204 from client 124.

An event service within an agent server 208 is registered as a part of the startup sequence of AgentServerService. This service receives interaction and analytics events from a real-time analytics framework 210 for calls and sends them to the system 100 via a Socket.IO connection with the RMS 110. The RMS 110 is the endpoint for the RAS Socket.IO-connections. The interaction and analytics events may be derived from acoustic analytics, linguistic analytics (for example, keywords and sentiment analysis from transcripts), biometric analytics (for example, does the person on the phone match a voice print), and desktop analytics.

When the event service starts, a list of configured tenants is obtained in order to maintain segregation of data when communicating with the RMS 110. Each tenant will have its own Socket.IO connection to the RMS 110 on a 1:1 basis. Once the list of tenants is known, the event service looks for configuration to see if the event notification is configured. This information may be contained in a configuration file, for example, "INTEGRATION FRAMEWORK-conf.xml," as shown below:

```
1 <External>
2    <CloudConfig>
3        <EXT_VCS xmlns="http://www.verint.com/EM/Metadata/2008/Roles/EXT_VCS" role:instanceID="855040" role:roleName="EXT_VCS" role:Identity="211">
4            <EXT_VCS_SETTINGS>
5    <AZURE_AUTH_SCOPE>ws://application/api/auth/.default</AZURE_AUTH_SCOPE>
```

```
6   <WA_URL>https://RegionalURL/LoadBalance/Address</WA_URL>
7                      <WA_UPN>Username</WA_UPN>
8                 </EXT_VCS_SETTINGS>
9         </EXT_VCS>
10  </CloudConfig>
11 </External>
```

If the CloudConfig settings to successfully communicate to system 100 are not configured for any tenants, the service does not register listeners for notifications (for example, interactions and analytics events). The CloudConfig settings also contain information to pass the Verint Cloud Platform (VCP) Authentication Configuration to the correct cloud instance. The VCP Authentication Config is parsed from the SecuritySettings.xml file by obtaining the VCPAuthentication element, decoding it using base64 URL decoding, and then decrypting it using the CCL (AES256) decryption. The VCP Authentication Config is configured on a per-tenant basis, which means that each connection to the WA server has its own set of credentials.

When receiving interaction or analytics events from the real-time analytics framework 210, a map of Session ID to Tenant IDs is populated from interaction messages to allow analytics events that do not have an explicitly set Tenant ID to be sent onward using the correct socket.IOconnection. This allows a lookup of analytics events based on the Session ID. This map is cleaned up when receiving a call end interaction message.

Provided a message has a tenant, it is then checked for a user principal name (UPN). If no UPN is present, the message is unable to be sent to a client who is logged into WA and is therefore not sent. If a message does have the Tenant ID and the UPN, it is passed to the SocketIoManager in order to be sent to WA using the correct socket.IOconnection.

The SocketIoManager contains a single executor that queues the work of sending messages via the socket.IOconnection for a given tenant. On startup and on configuration refresh, the map of Tenant to Socket.IO connections is created, and the connections themselves are established. Each of these connections requires the configuration from the VCP Authentication Config. The configuration here allows for fetching of the access token that is used when creating a Socket.IOconnection to the RMS 110.

The individual connections managed by the SocketIoManager are contained within SocketIoConnection. These connections directly handle the communication and connection to the RMS 110. When connecting to the RMS 110, there is a two-phase connection, where an initial connection begins with very basic communication. It listens for events on the following keywords: "Connect," "tenantInformation," "disconnect," "connect_error," "reconnect," "reconnect_attempt," and "event_close." This initial connection is to establish a connection to the RMS 110 and receive the "tenantInformation." This is done by the RMS 110 parsing the authentication token and the RMS 110 responding with a tenant. Once this information has been passed back to the SocketIoConnection, the second phase commences by creating a new namespace Socket.IOconnection. Any information sent to the RMS 110 is communicated via this new tenant-based namespace socket.

Notification Event API

Figure 3:
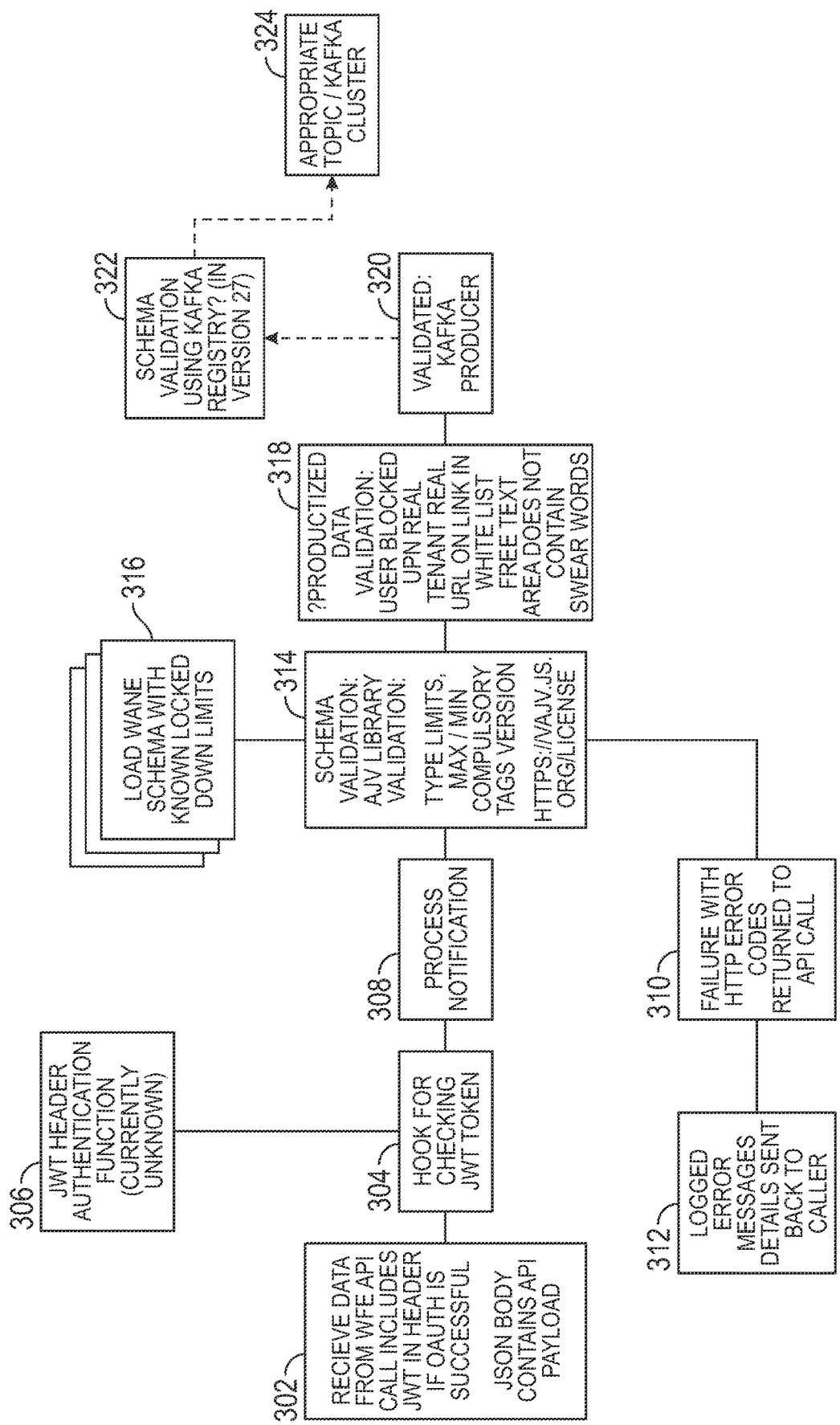
FIG. 3 illustrates the data flow associated with a notification event API, according to certain embodiments.

Referring to FIG. 3, there is illustrated a description of the data flow 300 associated with the notification event API 112 according to certain embodiments. At 302, the notification API 112 receives a message from a source, for example, the recorder integration servers 102 and/or cloud-based recorder 104. The source of the message includes the authentication token in the header of the message. At 304, the token is checked by the notification API 112. An authentication function 306 is used to perform the check at 304. At 308, the message is processed. The notification API 112 assumes a single message format which is matched against a single schema at 314. The schema itself may be in the form of a JSON file and is loaded up when initializing the library prior to beginning to accept messages. In operation, the library is asked to check each incoming message and responds by giving the message object a pass/fail. For messages that fail validation, the library returns HTTP error codes to the sender at 310, and the library makes available a detailed list of the validation errors found at 312. For example, the message sender may be sent an HTTP error code 400 (BAD REQUEST) to assist in troubleshooting.

At 318, data validation is performed. The notification API 112 may check to determine if the user is blocked, UPN is real, the tenant is real, the URL on a link is on a waitlist, a free text area does not contain any swear words, etc. At 320, the validated data is sent to the managed streaming component 114, which may perform schema validation at 322. Once validated, it is determined that the message is an appropriate topic to be placed into the managed streaming component 114 for further analysis.

Below is an example non-limiting notification payload design. Other notification payload designs consistent with the teaching below are considered to be within the scope of the present disclosure and claims.

```
{
    "upn": "bob@bob.com",
    "title": "Here I am",
    "iconType": "information",
    "message": "How do you do",
    "feedback": {
        "positive": [
            "Good",
            "Great",
            "Excellent"
        ],
        "negative": [
            "Bad",
```

```
          "Awful",
          "Terrible"
        ],
        "showFeedback": true
      },
      "actions": {
        "content": [
          {
            "Google": "aHR0cDovL3d3dy5nb29nbGUuY29t"
          },
          {
            "Amazon": "aHR0cHM6Ly93d3cuYW1hem9uLmNvbQ== "
          }
        ],
        "styledAsLinks": true
      },
      "expiryDuration ": 300,
      "highlightedDuration": 30,
      "timeOfEvent": "2021-12-09T11:31:05.442Z",
      "timeEventDetected": "2021-12-09T11:31:06.225Z"
    }
  ],
  "properties": {
    "upn": {
      "$id": "#/properties/upn",
      "type": "string",
      "format": "no-script-string",
      "title": "upn is in an email format.",
      "description": "upn is used to define what user the message goes to.",
      "minLength": 6,
      "maxLength": 255,
      "examples": [
        "hpalumbo0@free.fr"
      ]
    },
    "title": {
      "$id": "#/properties/title",
      "title": "The title of a notification",
      "description": "Title of event for display for message.",
      "type": "string",
      "format": "no-script-string",
      "minLength": 1,
      "maxLength": 255,
      "examples": [
        "Berlin Alexanderplatz"
      ]
    },
    "iconType": {
      "$id": "#/properties/iconType",
      "type": "string",
      "format": "no-script-string",
      "title": "The icon type",
      "description": "Icon type to display on an event.",
      "default": "information",
      "enum": ["information", "confirmation", "error", "warning", "question", "overTalk", "sadFace", "happyFace", "escalation", "clock"],
      "examples": [
        "information"
      ]
    },
    "message": {
      "$id": "#/properties/message",
      "type": "string",
      "format": "no-script-string",
      "title": "The message body",
      "description": "Content message of event to display.",
      "default": "",
      "minLength": 0,
      "maxLength": 2000,
      "examples": [
        "Cras mi pede, malesuada in, imperdiet et, commodo vulputate, justo."
      ]
    },
    "feedback": {
      "$id": "#/properties/feedback",
      "type": "object",
      "title": "The feedback object",
      "description": "Used to configure the feedback of a notification.",
      "default": { },
```

```
      "examples": [
        {
          "feedback": {
            "positive": [
              "Good",
              "Great",
              "Excellent"
            ],
            "negative": [
              "Bad",
              "Awful",
              "Terrible"
            ],
            "showFeedback": true
          }
        }
      ],
      "properties": {
        "positive": {
          "$id": "#/properties/positive",
          "type": "array",
          "title": "The positive array",
          "description": "Items that will be displayed as positive items on a notification.",
          "default": [ ],
          "items":
            {
              "type": "string",
              "format": "no-script-string",
              "minLength": 0,
              "maxLength": 500
            }
        },
        "negative": {
          "$id": "#/properties/negative",
          "type": "array",
          "title": "The negative array",
          "description": "Items that will be displayed as negative items on a notification.",
          "default": [ ],
          "items":
            {
              "type": "string",
              "format": "no-script-string",
              "minLength": 0,
              "maxLength": 500
            }
        },
        "showFeedback": {
          "$id": "#/properties/showFeedback",
          "type": "boolean",
          "title": "The showFeedback control",
          "description": "This controls if the up and down feedback buttons are displayed for a notification.",
          "default": true,
          "examples": [
            false
          ]
        }
      }
    },
    "actions": {
      "$id": "#/properties/actions",
      "type": "object",
      "title": "The actions list",
      "description": "Actions that can be displayed on a notification.",
      "default": { },
      "examples": [
        {
          "actions": {
            "content": [
              {
                "Google": "aHR0cDovL3d3dy5nb29nbGUuY29t"
              },
              {
                "Amazon": "aHR0cHM6Ly93d3cuYW1hem9uLmNvbQ== "
              }
            ],
            "styledAsLinks": true
          }
        }
      ],
```

```
            "properties": {
                "content": {
                    "$id": "#/properties/content",
                    "type": "array",
                    "title": "The content to be listed",
                    "description": "Content items that can be displayed on a notification.",
                    "default": [ ],
                    "items":
                        {
                            "$id": "#/properties/content/item",
                            "type": "object",
                            "title": "The content item",
                            "description": "Key value pairs of a content item that contains a display name and a base64 encoded URL.",
                            "additionalProperties": {
                                "type": "string",
                                "format": "no-script-string"
                            },
                            "examples": [
                                "{ \"Google\": \"aHR0cDovL3d3dy5nb29nbGUuY29t\" }"
                            ]
                        }
                },
                "styledAsLinks": {
                    "$id": "#/properties/styledAsLinks",
                    "type": "boolean",
                    "title": "The styledAsLinks controls formatting",
                    "description": "Controls if a content item is display as a link (If false item is displayed as a button).",
                    "default": false,
                    "examples": [
                        true
                    ]
                }
            }
        },
        "expiryDuration": {
            "$id": "#/properties/expiryDuration",
            "type": "integer",
            "title": "The expiryDuration value",
            "description": "Length of time (in seconds) after which this message becomes invalid.",
            "default": 30,
            "maximum": 3600,
            "minimum": 1,
            "examples": [
                243
            ]
        },
        "highlightedDuration": {
            "$id": "#/properties/highlightedDuration",
            "type": "integer",
            "title": "The highlightedDuration value",
            "description": "Length of time (in seconds) to display message on WA client UX.",
            "default": 10,
            "minimum": 1,
            "maximum": 600,
            "examples": [
                35
            ]
        },
        "timeOfEvent": {
            "$id": "#/properties/timeOfEvent",
            "title": "The timeOfEvent",
            "description": "Date timestamp, UTC time event occurred at Event Producer. If not supplied, the time the API is called will be used",
            "anyOf": [
                {
                    "type": "string",
                    "format": "date-time"
                },
                {
                    "type": "string",
                    "maxLength": 0
                }
            ],
            "examples": [
                "2021-12-09T11:31:05.442Z",
                "2021-12-09 11:31:05",
                "2021-12-09 11:31:05Z",
                "2021-12-09T11:31:05.442+01:00",
```

```
        "2021-12-09T11:31:05.442+0100",
        "2021-12-09T11:31:05.442−01:00",
        "2021-12-09T11:31:05.442−0100",
        "2021-12-09 11:31:05+01:00",
        "2021-12-09 11:31:05+0100",
        "2021-12-09 11:31:05−01:00",
        "2021-12-09 11:31:05−0100"
      ]
    },
    "timeEventDetected": {
      "$id": "#/properties/timeEventDetected",
      "title": "The timeEventDetected",
      "description": "Date timestamp, UTC time event was detected at Event Producer.",
      "anyOf": [
        {
          "type": "string",
          "format": "date-time"
        },
        {
          "type": "string",
          "maxLength": 0
        }
      ],
      "examples": [
        "2021-12-09T11:31:05.442Z",
        "2021-12-09 11:31:05",
        "2021-12-09 11:31:05Z",
        "2021-12-09T11:31:05.442+01:00",
        "2021-12-09T11:31:05.442+0100",
        "2021-12-09T11:31:05.442−01:00",
        "2021-12-09T11:31:05.442−0100",
        "2021-12-09 11:31:05+01:00",
        "2021-12-09 11:31:05+0100",
        "2021-12-09 11:31:05−01:00",
        "2021-12-09 11:31:05−0100"
      ]
    }
  }
}
```

Below is an example structure of the notification API. Other notification API structures consistent with the teaching below are considered to be within the scope of the present disclosure and claims.

```
openapi: 3.0.1
components:
  securitySchemes:
    bearerAuth:
      type: http
      scheme: bearer
      bearerFormat: JWT
  schemas:
    notification:
      type: object
      required:
        - upn
        - title
      properties:
        upn:
          type: string
          description: upn is used to define what user the message goes to.
          minLength: 6
          maxLength: 225
          example: daniela.harvey@techco.com
        title:
          type: string
          description: Title of event for display for message.
          minLength: 1
          maxLength: 255
          example: Here I am
        iconType:
          type: string
          description: Icon type to display on an event.
          default: information
          enum: ['information', 'confirmation', 'error', 'question', 'overTalk', 'sadFace', 'happyFace', 'escalation', 'clock']
          example: information
        message:
```

```
            type: string
            description: Content message of event to display.
            default: "\"\""
            minLength: 0
            maxLength: 2000
            example: How do you do
          feedback:
            type: object
            description: Used to configure the feedback of a notification.
            properties:
              positive:
                type: array
                description: Items that will be displayed as positive items on a notification.
                default: [ ]
                items:
                   type: string
                example: ['Good', 'Great', 'Excellent']
              negative:
                type: array
                description: Items that will be displayed as negative items on a notification.
                default: [ ]
                items:
                   type: string
                example: ['Bad', 'Awful', 'Terrible']
              showFeedback:
                type: boolean
                description: This controls if the up and down feedback buttons are displayed for a notification.
                default: true
                example: true
          actions:
            type: object
            description: Actions that can be displayed on a notification.
            properties:
              content:
                type: array
                items:
                   type: string
                example:
                   - Google: 'aHR0cDovL3d3dy5nb29nbGUuY29t'
                   - Amazon: 'aHR0cHM6Ly93d3cuYW1hem9uLmNvbQ== '
                default: [ ]
              styledAsLinks:
                 type: boolean
                 default: false
                 example: true
          expiryDuration:
            type: integer
            format: int32
            description: Length of time (in seconds) after which this message becomes invalid.
            default: 30
            maximum: 3600
            minimum: 1
            example: 300
          highlightedDuration:
            type: integer
            format: int32
            description: Length of time (in seconds) to display message on WA client UX.
            default: 10
            minimum: 1
            maximum: 600
            example: 30
          timeOfEvent:
            type: string
            format: date-time
            description: Date timestamp, UTC time (ISO8601) event occurred at Event Producer. If not supplied,
the time the API is called will be used.
            example: "2021-12-09T11:31:05.442Z"
          timeEventDetected:
            type: string
            format: date-time
            description: Date timestamp, UTC time (ISO8601) event was detected at Event Producer.
            example: "2021-12-09T11:31:05.442Z"
info:
  title: Work Assist REST APIs
  description: Service to send notification to Work Assist cloud service.
  version: "2.0"
  termsOfService: https://www.verint.com/our-company/legal-documents/verintcom-terms-of-service/
  license:
    name: Verint Master Customer Agreement
```

-continued

```
      url: https://www.verint.com/our-company/legal-documents/end-user-license-agreement/
    # Product Code metadata in Verint Connect Developer Portal
    x-vc-product_code: <Put predefined product code metadata for Verint Connect Developer Portal. List of
available shortcodes - https://community.verint.com/support/nt/kmp/non-technical---
processes/internal/km2244962>
  contact:
    name: API Support
    url: https://community.verint.com/support/
tags:
- name: public
servers:
  - url: https://use1.vcp.verintcloudservices.com/vcp/api/wa/
    description: Verint VCP-US-EAST
  - url: https://apse2.vcp.verintcloudservices.com/vcp/api/wa/
    description: Verint VCP-AU
security:
  - bearerAuth: [ ]
paths:
  /v2/notification:
    post:
      summary: WorkAssist API REST endpoint for sending notifications to WA cloud.
      requestBody:
        required: true
        content:
          application/json:
            schema:
              $ref: '#/components/schemas/notification'
      responses:
        '200':
          description: Ok - message processed.
          content:
            text/html; charset=utf-8:
              schema:
                type: string
        '400':
          description: Bad request - missing message, or schema validation failure.
          content:
            text/html; charset=utf-8:
              schema:
                type: string
        '401':
          description: Unauthorized - permissions issue.
          content:
            text/html; charset=utf-8:
              schema:
                type: string
        '500':
          description: Service unavailable - internal error.
          content:
            text/html; charset=utf-8:
              schema:
                type: string
        '503':
          description: Service unavailable - internal error.
          content:
            text/html; charset=utf-8:
              schema:
                type: string
      tags:
- public
```

Notification Event API Definition

Below is the notification event API definition. In the definition, a Property is an actual event API property. A Source is where the property is added or what is responsible for the property being added before the call is received. Known types are events are internal to the recorder integration server 102 and/or cloud-based recorder 104, and the appropriate HTML rendering to be displayed can be obtained from within an internal HTML server. Unknown events are events received from an unknown source, and the rendered information is either sent without content translation or can be offloaded to a third party for translation on the fly.

The Notification Event API 112 adds raw messages to the managed streaming component 114. A streams processor (within the managed streaming component) reviews raw events, validates them, and transforms them into processed events stored into a separate processed topic. The processor can include additional business logic using data from other real-time events when deciding on the appropriate transform. The events within the processed topic are consumed by the client management service. The Client API uses the events from the client management service to render the events within the user interface (FIG. 3: 318, 320, 322, 324).

TABLE 1

| Property | Source | Description | Example, notes |
| --- | --- | --- | --- |
| Version/Schema | plugin API | Version of event Producer. | this is just the endpoint of the API. Breaking change versions will use new end points |
| UserUPN | Responsibility of calling component | User Principal Name | Format: user.name@tenantCompany.com |
| TenantAuthorization | VCP Authorization token | Unique Tenant token provided by VCP which authenticates call. This can be used by Work Assist (i.e., the real-time contextual event notification system 100) internally to attribute the event to the correct tenant | generated dynamically during Azure authentication process |
| EventID | Event producer | a GUID that is produced during initial event generation that can be used to track/log the event individually across the product | |
| SourceID | Derived from XML content: Business logic in Kafka Processor | A known integer that denotes the source of the event. Future Authorized event producers will require their own known SourceID | |
| MessageType | WFE notification plugin | A known registered type (integer) that denotes the type of event being generated. This Type can be used to display Title, Icon, Heading and Messages for specific internal "known" events via localisation | Maps to a list of known message types and controls look and feel of message |
| SourceLocale | WFO UX | ISO language code. Denotes originating language of source message. | "en-US", "es-MX", "fr-CA" |
| Title | WFO UX | Optional, string. Title of event for display | |
| IconID | WFO UX | Optional. icon ID of event to display | This ID will be one of a fixed list of Icons. If outside the bound of the icon list, the default icon is set |
| Message | WFO UX | Optional. content message of event to display. | User driven content. User is person configuring the notification at customer site |
| Feedback | Kafka Processing | Boolean to denote feedback of some kind | Inferred by feedback lists. Can be property of event in Kafka for simple markup check, but may not be needed within Event API |
| FeedbackOptionsP | WFO UX | Optional. List of Positive | "Thanks", "Accurate", "useful", "Timely" |

TABLE 1-continued

| Property | Source | Description | Example, notes |
|---|---|---|---|
| FeedbackOptionsN | WFO UX | Feedback options to be selected Optional. List of negative Feedback options to be selected | "Spam", "Inaccurate", "Annoying", "Late arriving" |
| ButtonList | WFO UX | Optional. List of text to be displayed on work assist UX as buttons on message Clicking the button will attempt a new browser window open at appropriate ButtonURL | "abort", "retry", "cancel" If Work Assist is built as DPA compliant application, then DPA could fire triggers based on the buttons clicked as a cheap method of feedback and performing desktop actions |
| ButtonUrlList | WFO UX | Optional. List of target URLs to be available as buttons on work assist UX [Subject to whitelist] | "http://blah1", "http://blah2", "http://blah3", White listing within cloud configuration, although limited script injection validation is handled internally |
| ButtonAsLink | WFO UX | Boolean. Optional checkbox. | Allows render of buttons as html link instead of button |
| ExpiryTime | Event Producer | Number of seconds that elapse after which the event is irrelevant | |
| Duration | Event Producer | number of seconds the event may be displayed prominently on UX | |
| TimeOfEvent | Event Producer | datetimestamp, UTC time event occurred | Some detection systems might be able to distinguish between the time the event happened and the time the event was actually detected. Other systems may report the same time for both of these properties |
| TimeEventDetected | Event Producer | datetimestamp, UTC time event was detected | |
| EventUTCOffSet | Event Producer | Timezone offset for the device where the event was detected | |
| TimeEventReceived | Work Assist API | datetimestamp, UTC time event was received by Work Assist | If this is the API facing WFE or third parties, then this event received timestamp is generated by the Work Assist server at the time it receives the API call from WFE. |
| EventPayload | Event Producer | XML source of original payload | full XML payload could be large. In initial design, the payload is sent to kafka for parsing rather than parsed within WFE notification |

Managed Streaming Component

The managed streaming component 114 is a distributed data store for ingesting and processing streaming data in real-time. Streaming data is data that is continuously generated by the sources (for example, 102 and 104), which typically send the data simultaneously. The managed streaming component 114 processes this data and provides the functionalities of publishing and subscribing to streams of records, storing streams of records in the order in which the records were generated, and processing the streams of records in real-time. The managed streaming component 114 combines messaging, storage, and stream processing to allow storage and analysis of both historical and real-time data.

Client Management System (CMS)

Figure 4:
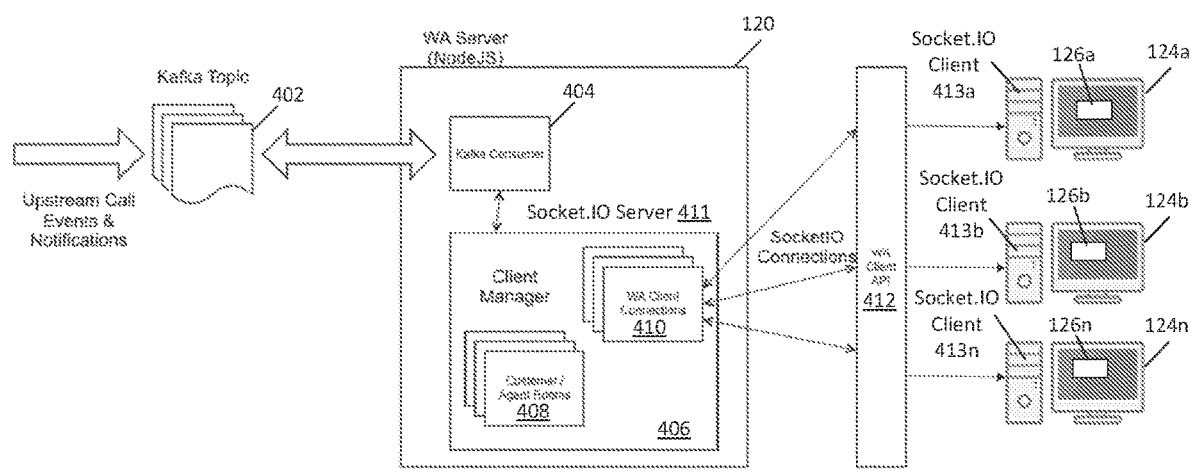
FIG. 4 illustrates a work-flow of the components within a client management service (CMS), according to certain embodiments.
Figure 5:
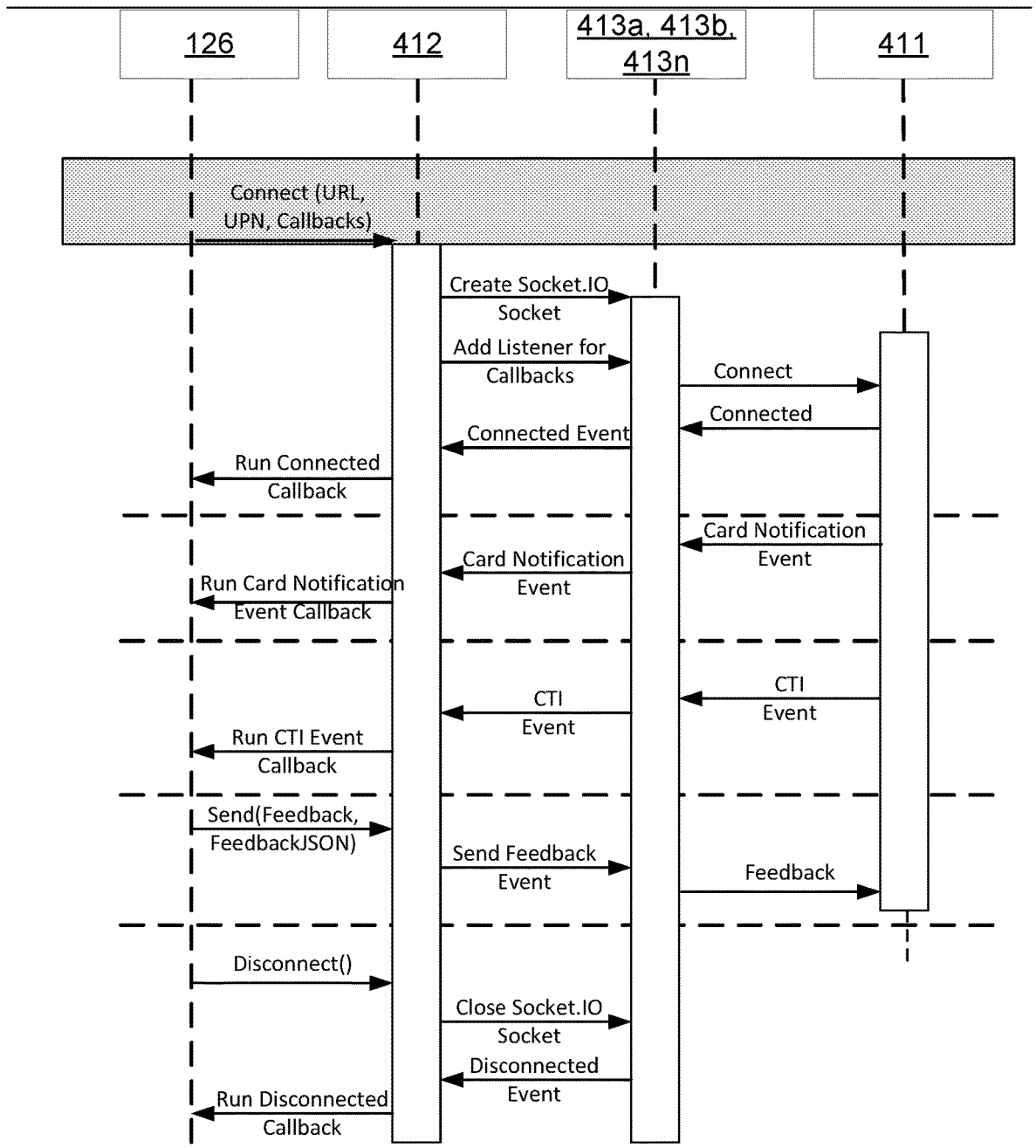
FIG. 5 illustrates a call flow diagram of communication between the components of FIG. 4, according to certain embodiments.

The client management system 120 is responsible for delivering the messages provided by topic to the client application 126. The Client Management System (CMS) 120 is a client package that exposes a client API designed to wrap around Socket IO to interact with the managed streaming component 114 to receive/send events. FIG. 4 illustrates a work-flow of the components within the CMS 120 that are communicating with each other according to certain embodiments. FIG. 5 illustrates a general call flow diagram of communication between the notification application executing on the client 124 and Socket.IO Server 411 on the CMS 120 that is shown in FIG. 4 as part of the work-flow according to certain embodiments.

As shown in FIG. 4, the CMS 120 is responsible for consuming events from the managed streaming component topic, sending the events to the appropriate room 408, receiving feedback messages from room 408 as feedback data, and sending feedback messages to the topic, as shown in the sequences of FIG. 4. As shown in FIG. 4, the general work-flow is as follows. Events are delivered to a consumer 404 of the CMS 120 from the managed streaming component 114 related to a topic 402. The consumed events are forward to a client manager 406 (for example, the Socket.IO Server 411) that forwards events to the appropriate client application 126a, 126b, 126n using a respective Socket.IO Client 413a, 413b, 413n. The events are delivered using a JavaScript client API 412. Other languages noted herein may be used. The CMS 120 will also take feedback messages from the clients 124a, 124b, 124n to deliver to the topic.

The client manager 406 maintains the list of rooms 408 (i.e., connections 410). The client manager 406 stores the rooms 408 and uses this store of information to route incoming events (from the consumer 404) to the desired connections 410. New connections register with client manager 406, and the client manager 406 will create a room 408 for receiving the events from the clients 124a, 124b, 124n. An Agent ID value is used to store information in room 408. The client manager 406 also manages the lifecycle of the room 408. Each room 408 is responsible for the Socket.IO connection with its respective client 124a, 124b, 124n and contains functionality to send and receive the events from the client 124a, 124b, 124n.

FIG. 5 illustrates how the client API will be situated and used for the various use cases for sending and receiving messages from the Socket IO Server according to certain embodiments. The following general structure may be applied to message objects:

```
{
    string? apiVersion,
    string timestamp,
    object? data, <- where its contents differ from other message types
    object? error
}
```

Event types may be as follows:
From the RIS 204:
  i. WorkAssist Messages aka Mentoring Tips aka Notifications=>eventType: 'notificationEvent',
  ii. Call Start/End/Update=>eventType: 'callEvent',
From the client 124
  iii. Feedback=>eventType: 'feedbackEvent', Below is a non-limiting example message format definition. Other message format definitions consistent with the teaching below are considered to be within the scope of the present disclosure and claims.

```
{
Required: title, upn
upn:
    string minLength:6 maxLength:225
upn is used to define what user the message goes to.
example: daniela.harvey@techco.com
title:
    string minLength:1 maxLength:255
Title of event for display for message.
example: Here I am
iconType:
    string
Icon type to display on an event.
Default: information
Enum: information, confirmation, error, question, overTalk, sadFace, happyFace, escalation, clock
example: information
message:
    string maxLength:2000
Content message of event to display.
Default: ""
example: How do you do
feedback:
    {
Used to configure the feedback of a notification.
positive:
[
Items that will be displayed as positive items on a notification.
string
]
example: Good,Great,Excellent
negative:
[
Items that will be displayed as negative items on a notification.
string
]
example: Bad,Awful,Terrible
showFeedback:
    boolean
This controls if the up and down feedback buttons are displayed for a notification.
Default: true
example: true
```

```
actions:
    {
Actions that can be displayed on a notification.
content:
[
string
]
example: [object Object],[object Object]
styledAsLinks:
boolean
example: true
}
expiry Duration:
    integer (int32) minimum:1 maximum:3600
Length of time (in seconds) after which this message becomes invalid.
example: 300
highlightedDuration:
    integer (int32) minimum:1 maximum:600
Length of time (in seconds) to display message on WA client UX.
example: 30
timeOfEvent:
    string (date-time)
Date timestamp, UTC time (ISO8601) event occurred at Event Producer. If not supplied, the time the API is called
will be used.
example: 2021-12-09T11:31:05.442Z
timeEventDetected:
    string (date-time)
Date timestamp, UTC time (ISO8601) event was detected at Event Producer.
example: 2021-12-09T11:31:05.442Z
}
```

Below is a non-limiting example message format. Other notification message formats consistent with the teaching below are considered to be within the scope of the present disclosure and claims.

```
{
"upn": "Benjamin.Keeling15@gmail.com",
"title": "Liaison AI Metal Cambridgeshire International",
"iconType": "sadFace",
"message": "Outdoors haptic connect Music Web Graphic Iowa infomediaries Aruban synthesize",
"feedback": {
"positive": [
"harness",
"XSS",
"Peru",
"RAM",
"next-generation",
"Yen"
],
"negative": [
"invoice",
"Uruguay",
"Tasty",
"Berkshire",
"Tasty",
"process"
],
"showFeedback": true
},
"actions": {
"content": [
{
"navigate": "aHR0cDovL3JvZG9sZm8ub3Jn"
},
{
"Amazon2": "aHR0cHM6Ly93d3cuYW1hem9uLmNvbQ== "
},
{
"Cambridgeshire": "aHR0cDovL2pveS5jb20="
},
{
"Goggle": "aHR0cDovL3d3dy5nb29nbGUuY29t"
}
],
"styledAsLinks": true
```

},
"expiryDuration": 564,
"highlightedDuration": 33,
"timeOfEvent": "2022-02-02T17:31:36.619Z",
"timeEventDetected": "2022-02-02T17:31:56.619Z"
}

Client Application

The client application 126 may include a wrapper built using, for example, the Electron chromium browser application and a React JavaScript application. As such, the client application 126 may be cross-platform and may run on various different clients 124 having different operating systems, display areas, and processors, so long as they are capable of executing a browser application. The wrapper provides operating system functionality, such as, always in focus, 'stickyness' and pass through to system notifications when minimized. The React application inside the wrapper is structured by defining components, such as screen components, user interface (UI) components and atom components. The screen components define the visible page that is displayed to an end-user (src/pages). The UI components are the building blocks of the displayed pages (src/components). The atom components are simple components not specific to event notification (src/components/atoms).

Screen Components

The screen components are components of the client application 126, which uses the various UI components as building blocks to build the screens the user sees and interacts with. An example definition is shown in FIG. 16.

Figure 6:
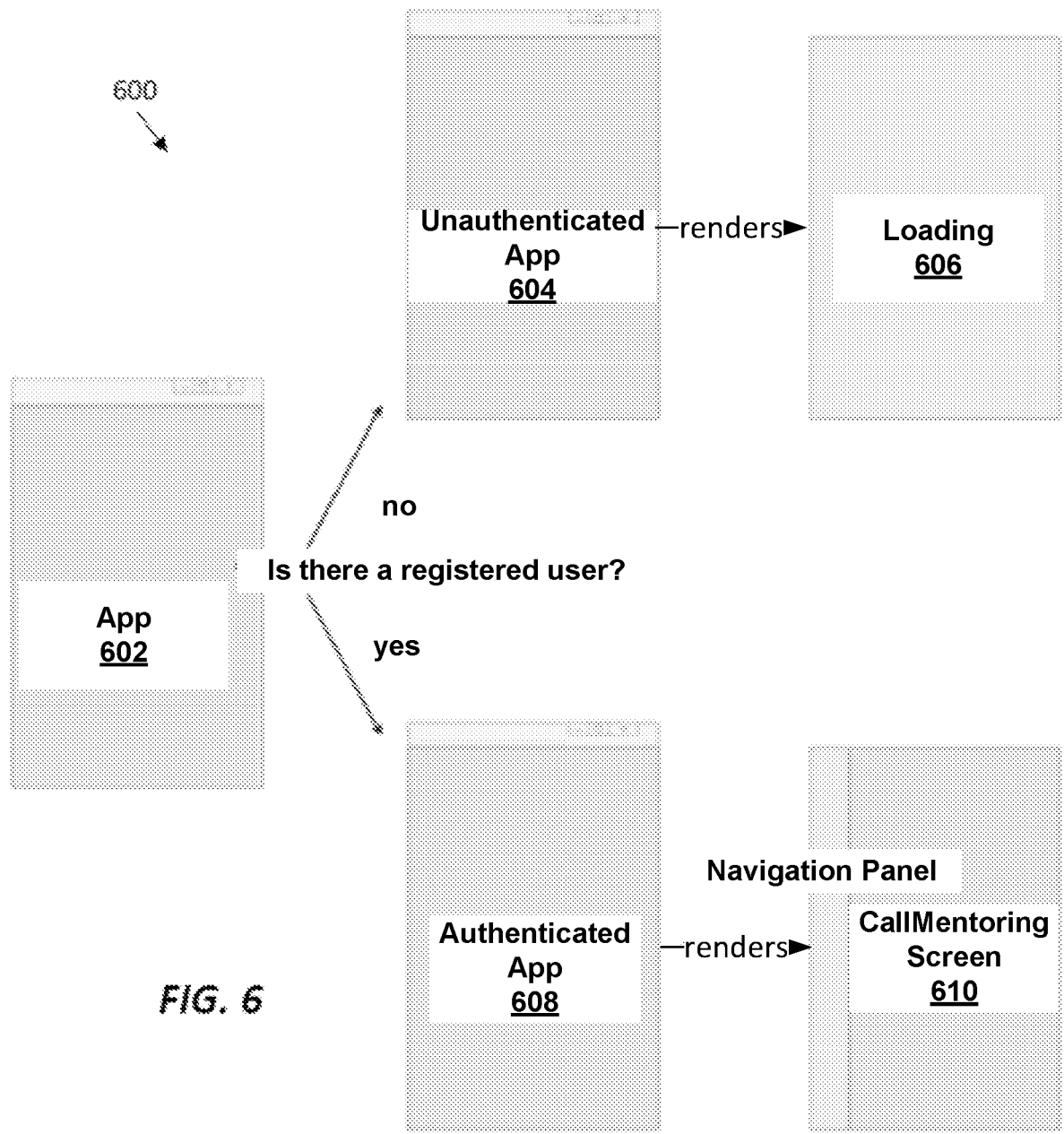
FIG. 6 illustrates an overview of the components within a client user interface, according to certain embodiments.

Below is a hierarchy of the execution of the definition.
1 App: display a version of the app whether there is an authenticated user or not
2—UnauthenticaedApp—the app for unauthenticated users
3. LoginRedirect—displays a loading screen and redirects to MS authentication
4. Logout—displays a loading screen, cleans the user and redirects to main screen
5—AuthenticatedApp—the app for authenticated users
6—NavigationPanel—displays the available pages/screens
7. LogoutButton—displays a button that redirects the user to the MS Logout page
8. Avatar—displays the user profile image or a generated one or a default one
9—AppRoutes—displays the selected page/screen
10.—<screen>—displays the selected page/screen Screen Components FIG. 6 illustrates an overview of the components within a client user interface 600 according to certain embodiments. Examples of the client user interface are shown in FIGS. 8A and 8B according to certain embodiments. An App component 602 loads either an AuthenticatedApp 608 or UnauthenticatedApp 604 component, in accordance with whether the user is authenticated or not.

```
1     // App.jsx (adapted)
2     import { useUser } from './context/user-context';
3
4     function App( ) {
5       return user ?
6         <AuthenticatedApp user={user} />
7         :
8         <UnauthenticatedApp />;
9     }
```

The UnauthenticatedApp 604 shows a login screen (Loading 606) that uses a login component so the user can gain access to the real-time contextual event notification system 100. The AuthenticatedApp 608 will load the services available to an authenticated user (for example, an AppRoutes module). The AppRoutes module loads the CallMentoring screen 610 (see FIG. 8A, 8B) of the real-time contextual event notification system. This hierarchy allows for future iterations to contain more services and more screens.

Figure 17:
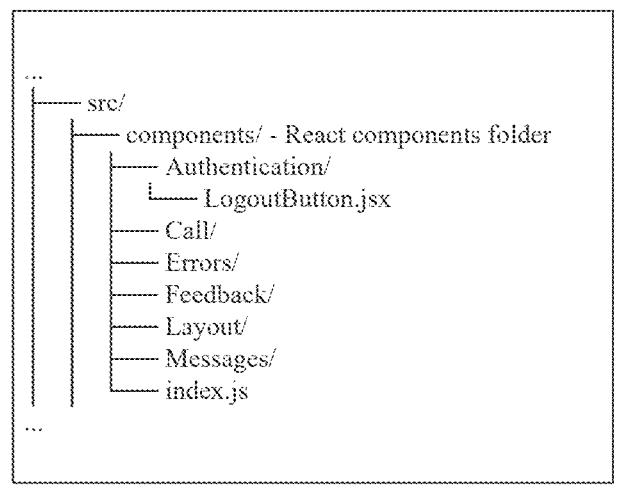
FIG. 17 is an illustration of the building blocks of the user interface.

The CallMentoring screen 610 is where notifications are displayed and managed by a support agent or other end-user.
1—CallMentoring:
2—CallStatus: Displays a greeting or the callerNumber and the callTime
3. Timer: Displays a time counter, that ticks every second.
4—MessageList: Displays a list of messages
5* Message: Displays one message
6. FeedbackBar: Displays the 'form' that allows the user to send feedback about the received message
7. FeedbackButton: Either displays a simple button, or a button that opens up a feedback dialog User Interface Components The building blocks of the user interface are shown in FIG. 17.

Figure 9A:
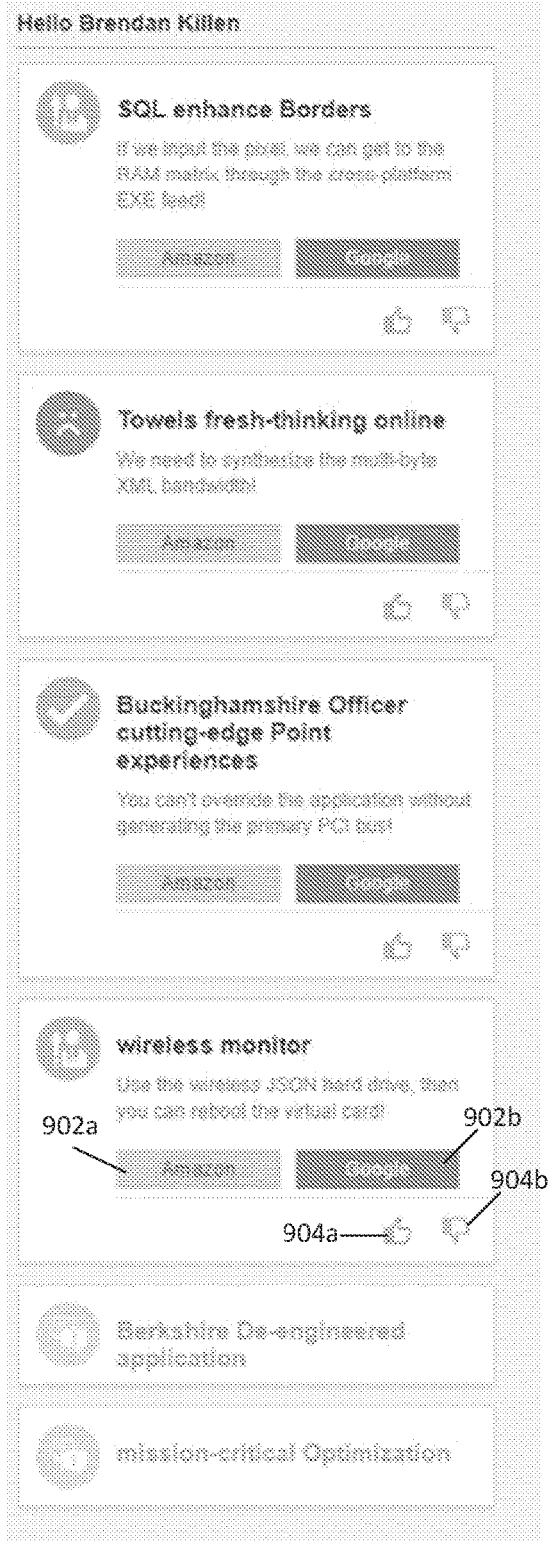
FIGS. 9A and 9B illustrate an example user interface of the client application, according to certain embodiments.
Figure 9B:
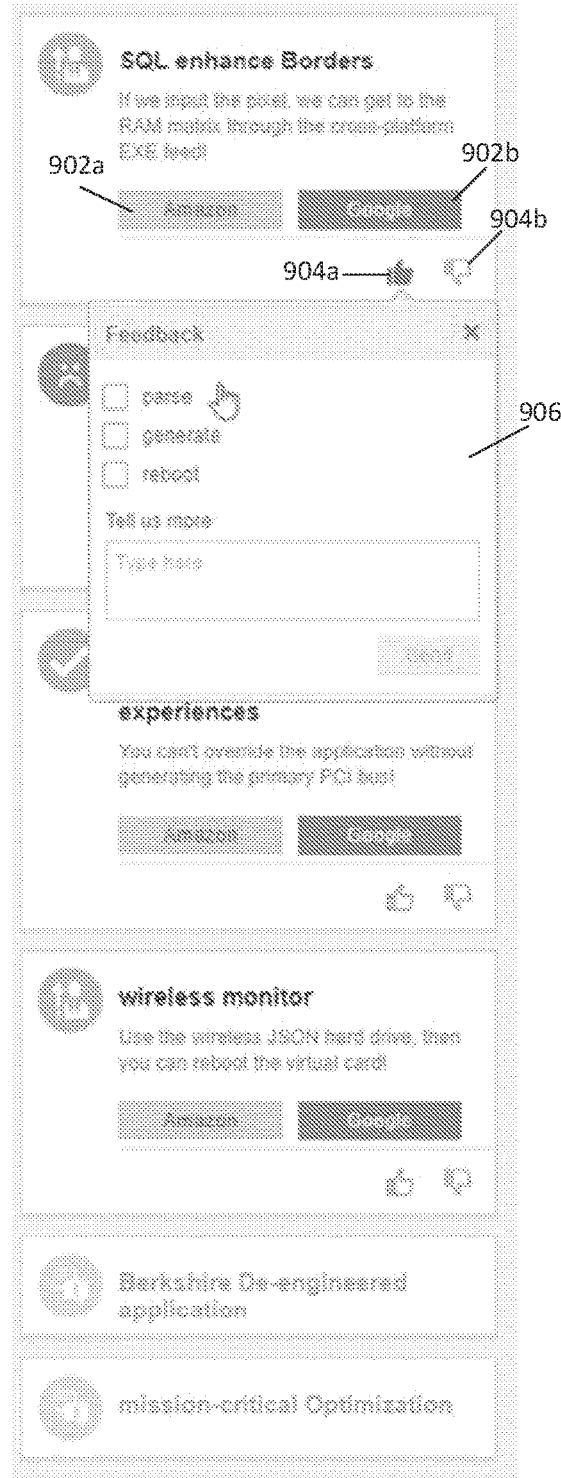

FIGS. 7, 8A, and 8B illustrate example user interface elements that populate the user interface of the client application 126 according to certain embodiments. FIGS. 9A and 9B illustrate an example user interface of the client application 126. FIG. 7 illustrates example icons that may be used to convey real-time contextual event messages according to certain embodiments. The icons are provided to enable the support agent to quickly identify a frame of reference for the displayed notification message. FIGS. 8A and 8B illustrate example notifications that may be presented in the user interface of the client application 126. The notifications utilize one of the icons of FIG. 7 together with a title (for example, Complaint, Long time to respond, Frustrated Customer, etc.) and an explanation or suggestion to the support agent to handle the cause of the notification.

FIG. 9A shows that the notifications may be stacked on top of each other in the user interface according to certain embodiments. The notifications may be closed (shown in gray) after being acted on by the support agent or after a period of time elapses. Buttons 902a, 902b are included such that the support agent may perform another action based on the notification (for example, look up a product at Amazon or Google). The user interface includes voting buttons 904a, 904b to enable the support agent to provide feedback about the notification. As shown in FIG. 9B, when the support agent presses the positive feedback button 904a, a dialog box 906 is displayed to enable the support agent to provide feedback through an action box and/or text box.

Figure 10:
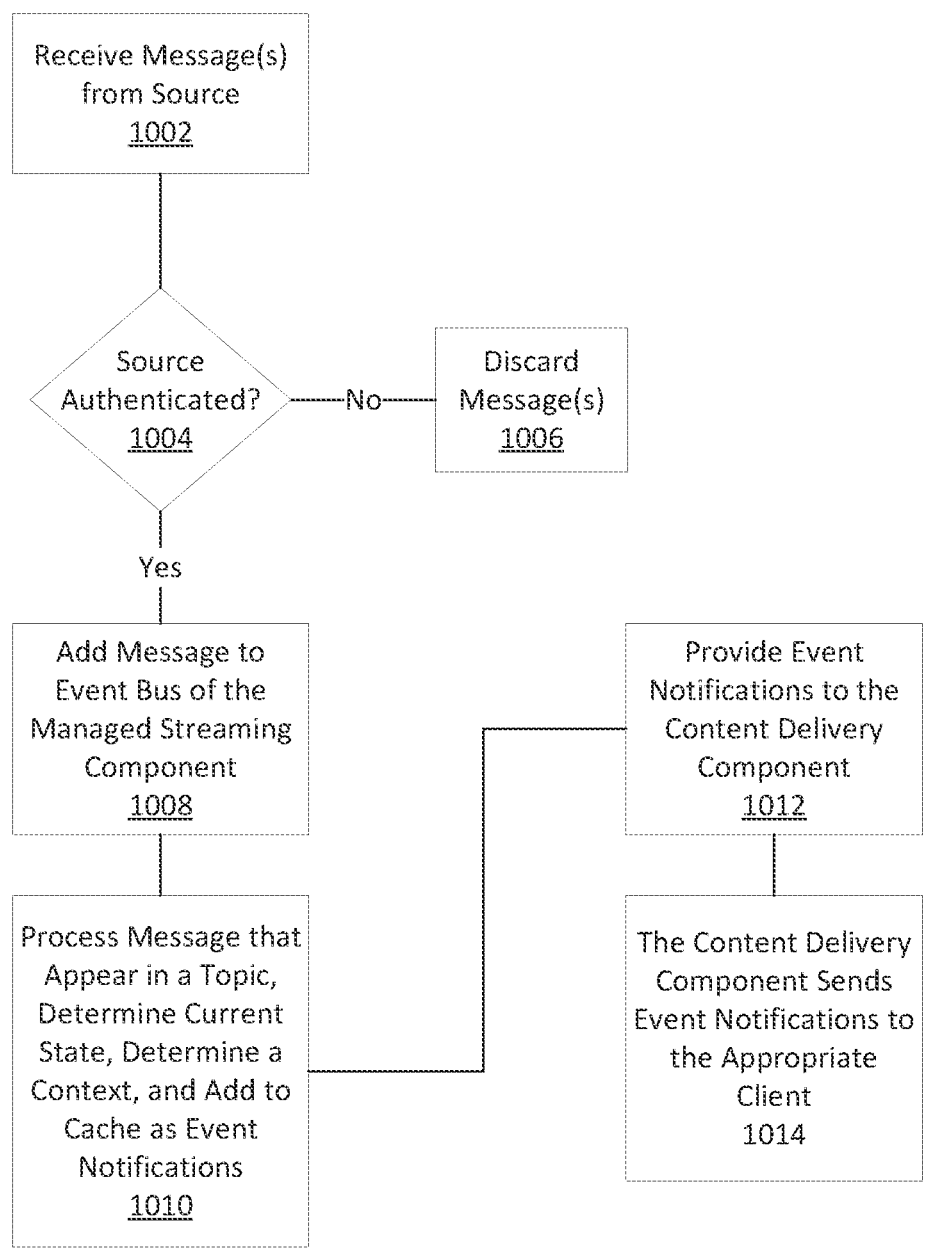
FIG. 10 illustrates an example flow diagram of operations performed by the real-time contextual event notification system, according to certain embodiments.

FIG. 10 illustrates an example flow diagram of operations performed by the real-time contextual event notification system 100, according to certain embodiments. At block 1002, messages are received by system 100 or, more specifically, API gateway component 106 and/or RMS 110, from a source (e.g., a customer service agent's workstation). For example, in some embodiments, recorder integration server 102 and/or cloud-based recorder 104 send messages to the API gateway component 106 that accepts application programming interface (API) calls over a socket connection from the recorder integration server 102 and/or cloud-based recorder 104.

At block 1004, it is determined (e.g., by API gateway component 106) if the received message is authenticated. The messages included the token provided by the authentication component 108 and the RMS 110. If the message is not authenticated, it is discarded at block 1006. If the message is authenticated, then at block 1008, it is added to a message bus of the managed streaming component 114. For example, authenticated messages can be forwarded from the API gateway component 106 to the notification API 112 that provides a RESTful API to connect the events to the event bus of the managed streaming component 114.

At block 1010, the authenticated, received message is processed by managed streaming component 114, a current state is determined, and it is added to a cache (e.g., cache 116). The managed streaming component 114 processes messages that appear in the raw topic determine the current state of the call using the incoming events, determines a context (the state of the recipient and the circumstances that generated the notification) and updates/adds to the cache 116 with the most current event of the call(s), and adds event notifications to the processed topic as notification event(s) for consumption by the client management service (CMS) 120.

At block 1012, the event notifications are provided to the CMS 120 by managed streaming component 114 and/or cache 116. The CMS 120 consumes the notification event(s) and determines which attached client is the target for the message. At block 1014, the CMS 120 sends the notification event(s) to the appropriate client that is the target the message. The CMS 120 is an API designed to wrap around Socket IO for the handling of the socket to setup easy-to-use commands to interact with the system 100 to receive/send events. The notification is presented in a user interface that is delivered by the content delivery component 122. The content delivery component 122 may be provided as JavaScript libraries that are interpreted by a plugin on a client application 126 (for example, a browser) executing on the client 124 to render the user interface. Target users connect to the real-time contextual event notification system 100 via a web application hosted in a native browser or desktop electron application.

Figure 11:
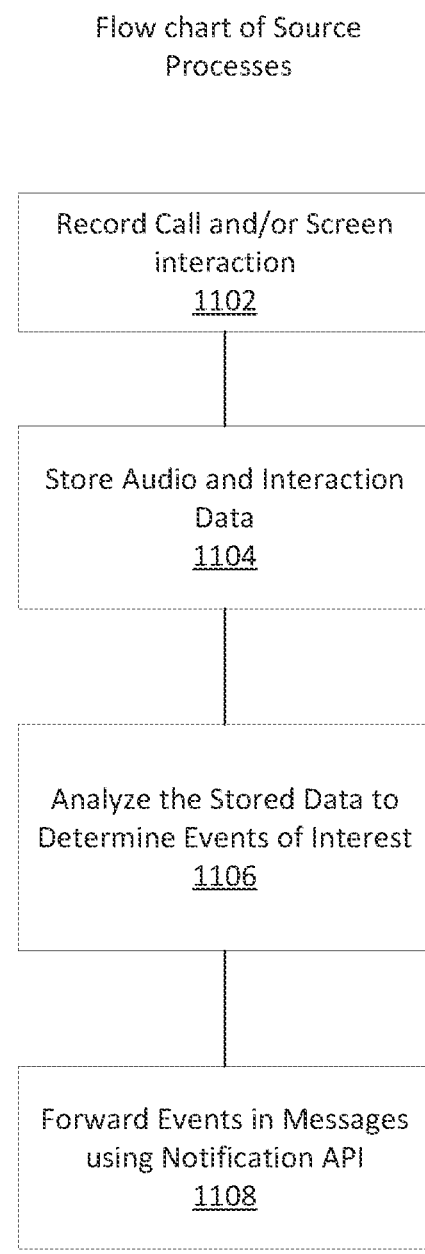
FIG. 11 illustrates an example flow diagram of operations performed by a source of data that is provided to the real-time contextual event notification system, according to certain embodiments.

FIG. 11 illustrates an example flow diagram of operations performed by a source of data that is provided to the real-time contextual event notification system, according to certain embodiments.

At block 1102, the source records audio (e.g., phone call) and/or screen interactions between, for example, a customer and a support agent. In some embodiments, the audio and/or screen interactions are recorded by recorder integration server 102 and/or cloud-based recorder 104. In other embodiments, the source device (e.g., a support agent's workstation) records the interactions, such as by implementing a recording software, and subsequently provides the interactions to recorder integration server 102 and/or cloud-based recorder 104. As a customer conducts a voice communication session (i.e., an audio interaction) with an agent, the call recorder 202 (e.g., of recorder integration server 102 and/or cloud-based recorder 104) records audio and screen interaction data to enable search, replay, and report on calls by topic. At block 1104, the audio and interaction data is stored at, for example, a Recoding Archive Service (RAS) 206.

At block 1106, the stored data is analyzed by real-time analytics framework 210 (e.g., shown in FIG. 2) to determine events of interest. In particular, real-time analytics framework 210 may determine analytics events that are derived from acoustic analytics, linguistic analytics (for example, keywords and sentiment analysis from transcripts), biometric analytics (for example, does the person on the phone match a voice print), and desktop analytics. At block 1108, the events are forwarded using notification event API 112. For example, a call may be made by the RAS 206 to the RMS 110, which is the endpoint for the socket.IO connections from the recorder integration servers 102 and/or cloud-based recorder 104.

Figure 12:
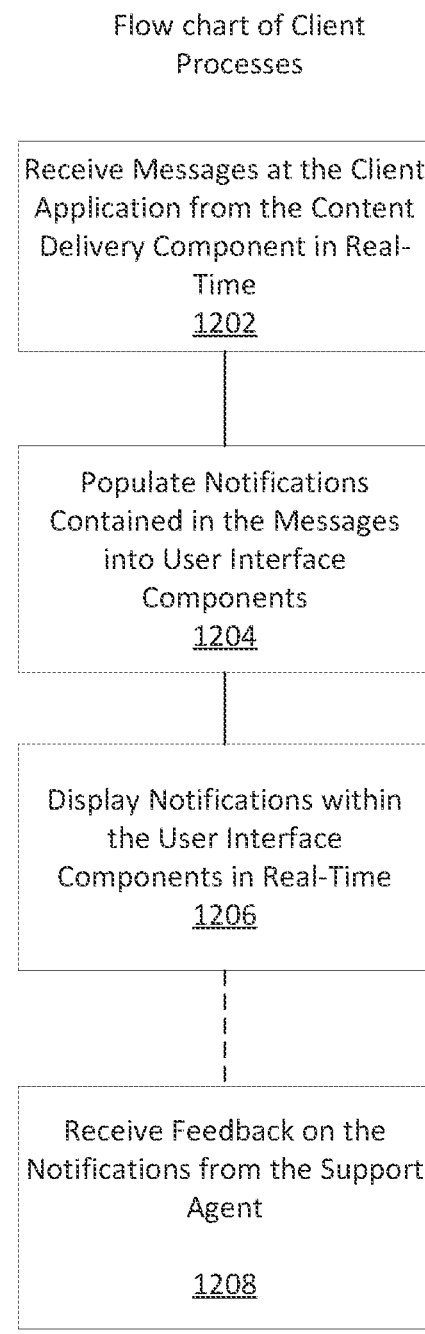
FIG. 12 illustrates an example flow diagram of operations performed by a client that receives targeted notifications from the real-time contextual event notification system, according to certain embodiments.

FIG. 12 illustrates an example flow diagram of operations performed by a client that receives targeted notifications from the real-time contextual event notification system according to certain embodiments.

At block 1202, messages are received by the client application 126 from the CMS 120 in real-time. The events are delivered to the client application 126 using the client API 412. At block 1204, the notifications are populated into user interface components and at block 1206, the notifications are displayed in the user interface. The client application 126 defines screen components, one of which is the CallMentoring screen 610 where notifications are displayed and managed by a support agent or other end-user.

Optionally or additionally at block 1208, feedback on the notification from the support agent is received by the CMS 120. The user interface may include voting buttons 904a, 904b to enable the support agent to provide feedback about the notification.

Example Use Cases

The Send events to work Assist desktop clients for notification of generated events from WFE/foundation notifications framework.

Send events to Work Assist desktop clients for notification of generated events from third-party event sources.

Figure 13:
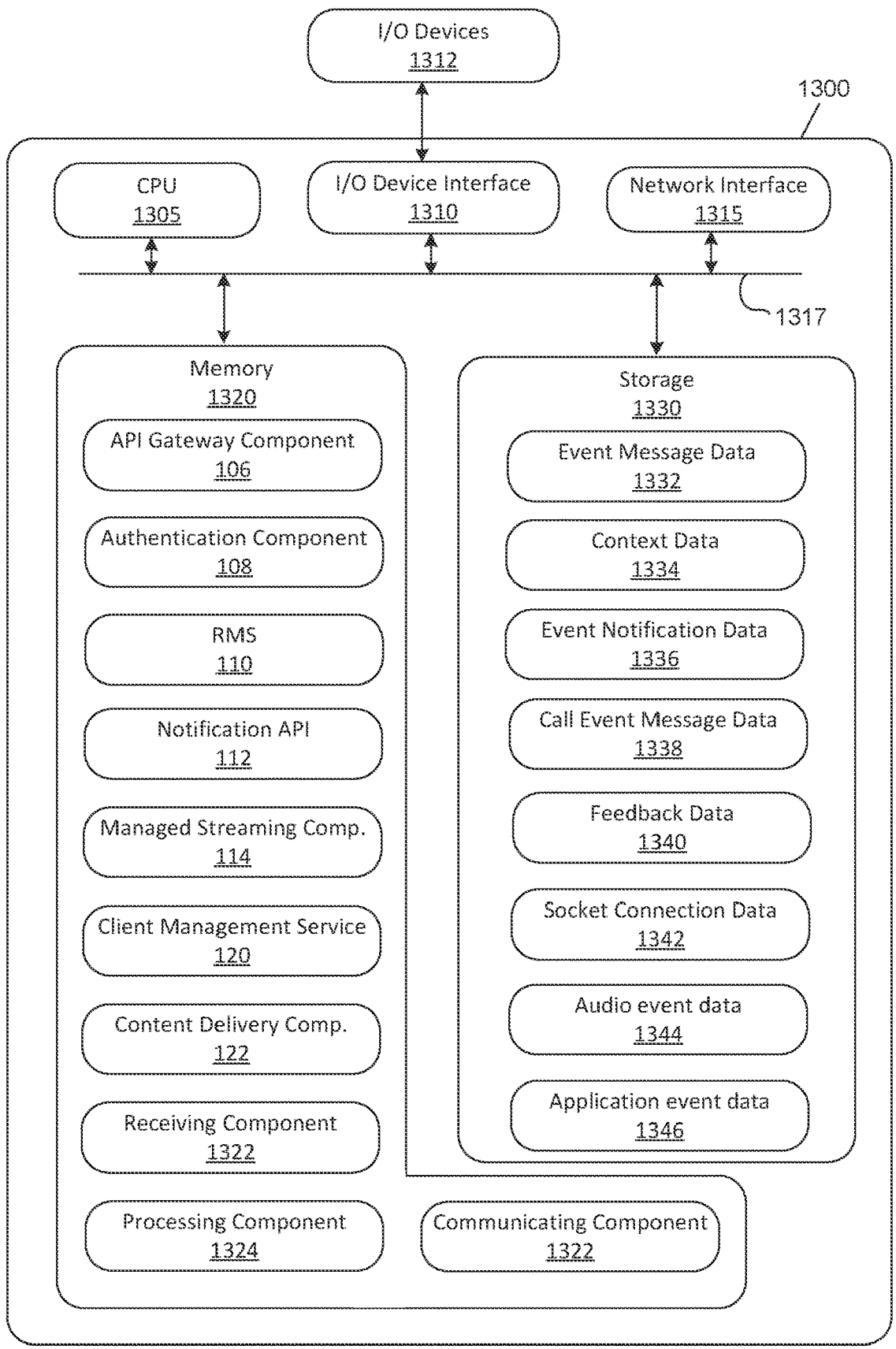
FIG. 13 is a schematic diagram of computer hardware that may be utilized to implement event notification processing in accordance with the disclosure, according to certain embodiments.

FIG. 13 illustrates examples of a computing system 1300 that may include the kinds of software programs, data stores, and hardware that can implement event message processing, context determination, notification generation, and content delivery, as described above according to certain embodiments. As shown, the computing system 1300 includes, without limitation, a central processing unit (CPU) 1305, a network interface 1315, a memory 1320, and storage 1330, each connected to a bus 1317. The computing system 1300 may also include an I/O device interface 1310 connecting I/O devices 1312 (e.g., keyboard, display, and mouse devices) to the computing system 1300. Further, the computing elements shown in computing system 1300 may correspond to a physical computing system (e.g., a system in a data center) or may be a virtual computing instance executing within a computing cloud.

The CPU 1305 retrieves and executes programming instructions stored in the memory 1320 as well as stored in the storage 1330. The bus 1317 is used to transmit programming instructions and application data between the CPU 1305, I/O device interface 1310, storage 1330, network interface 1315, and memory 1320. Note, CPU 1305 is included to be representative of a single CPU, multiple CPUs, one or more virtual CPUs, a single CPU having multiple processing cores, and the like, and the memory 1320 is generally included to be representative of a random access memory. The storage 1330 may be a disk drive or flash storage device, or virtual storage. Although shown as a single unit, the storage 1330 may be a combination of fixed and/or removable storage devices, such as fixed disc drives, removable memory cards, optical storage, network attached storage (NAS), or a storage area-network (SAN).

Illustratively, the memory 1320 includes an API gateway component 106, an authentication component 108, a recorder management system 110, a notification API 112, a managed streaming component 114, a client management system 120, and a content delivery component 122, all of which are discussed in greater detail above. In some embodiments, memory 1320 further includes a receiving component 1322 configured to receive data (e.g., via bus 1317). For example, receiving component 1322 may receive event messages that are transmitted from I/O devices 1312 to I/O device interface 1310. In some embodiments, memory 1320 includes a processing component for processing event messages and/or identifying an additional component of memory 1320 to process received event messages. In some embodiments, this processing is handled by CPU 1305. In some embodiments, memory 1320 includes a communicating component configured to route data between the various components of memory 1320.

Further, storage 1330 includes event message data 1332, context data 1334, event notification data 1336, call event message data 1338, and feedback data 1340, all of which are also discussed in greater detail above. Additionally, in some embodiments, storage 1330 may include socket connection data 1342, which may include any data relating to a socket connection. For example, socket connection data 1342 may include data indicating whether one or more socket connections have been authenticated. As another example, socket connection data 1342 may indicate a source associated with each of one or more socket connections. In some embodiments, storage 1330 includes audio event data 1344. Audio event data 1344 generally include linguistic and acoustic event data, as described herein. In some embodiments, storage 1330 includes application event data 1346, which is described in detail above.

API Call and Connection Authentication

Figure 14A:
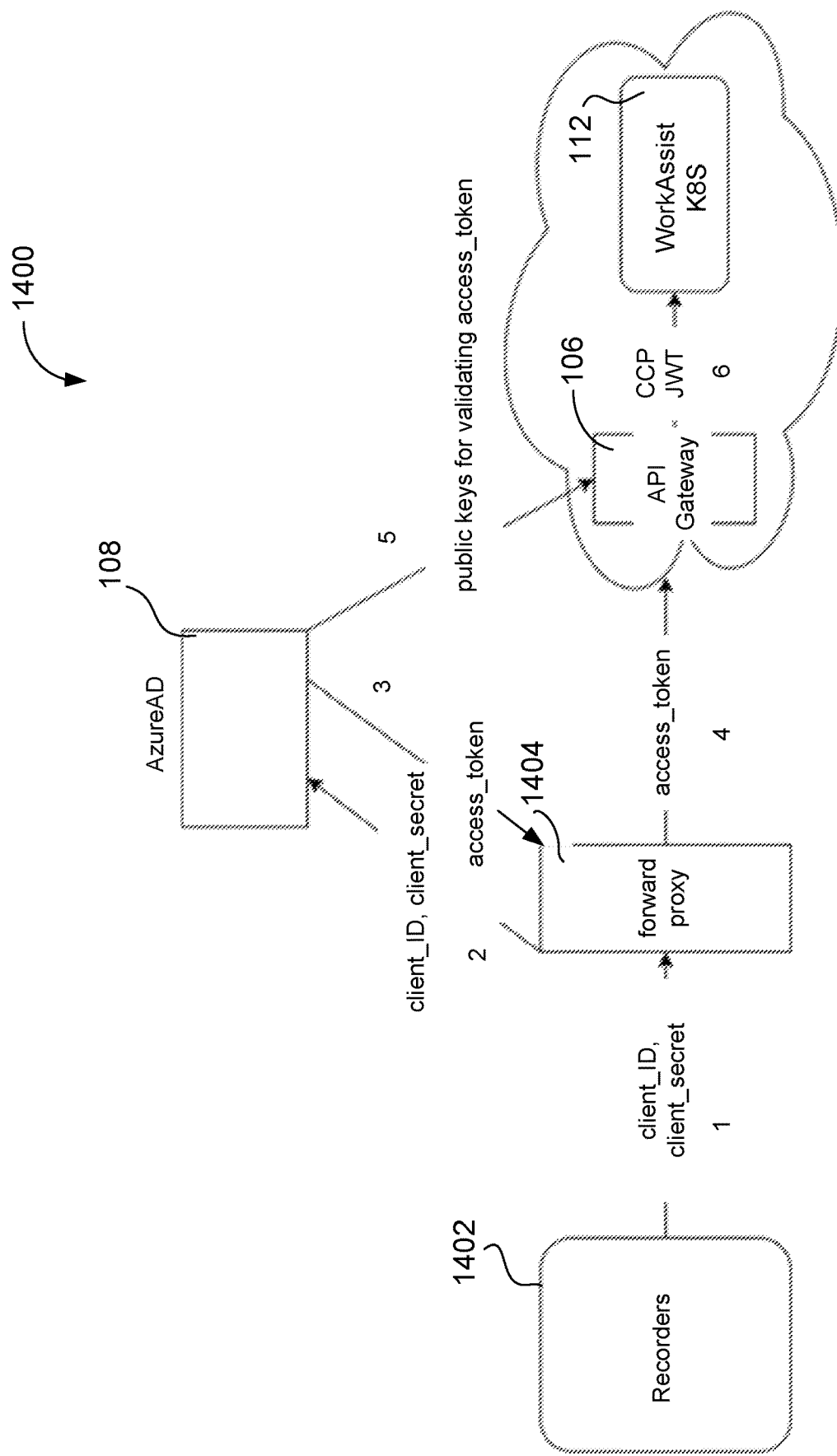
FIG. 14A is a block diagram of an authentication architecture for authenticating an API call, according to certain embodiments.
Figure 14B:
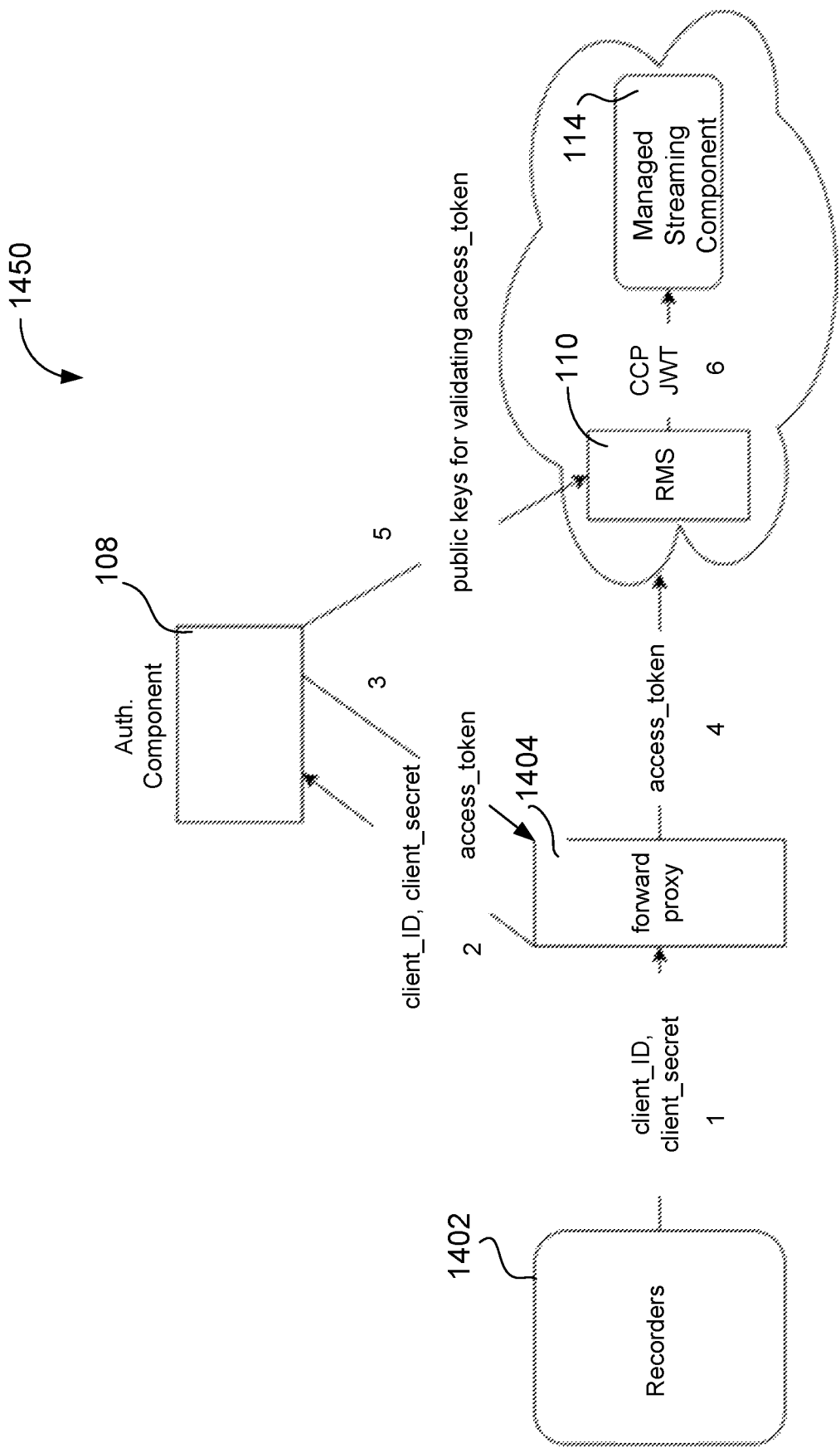
FIG. 14B is a block diagram of an authentication architecture for authenticating a persistent web socket connection, according to certain embodiments.

Referring generally to FIGS. 14A and 14B, block diagrams illustrating different configurations of an authentication architecture are shown, according to some embodiments. FIG. 14A, in particular, shows an authentication architecture 1400 for authenticating RESTful API calls, whereas FIG. 14B shows an authentication architecture 1450 for authenticating persistent web socket connections (e.g., as discussed above with respect to FIG. 2). Broadly, architecture 1400 represents a structure of components and a flow of data for authenticating an incoming connections. To this point, architecture 1400 is generally implemented by various components of system 100, including server 102/recorder 104/recorder 202 (herein generally referred to as recorders 1402), API gateway component 106, authentication component 108, RMS 110, and/or notification API 112.

At a high level, architectures 1400/1450 represent a "Daemon flow" authentication architecture. In some embodiments, identification data for one of recorders 1402 is authenticated using Daemon flow authentication via authentication component 108, which generates an access token and corresponding validation keys. Subsequently, an API call (e.g., including the access token) can then be validated by API gateway component 106 such that recorders 1402 can transmit event data to notification API 112. Additionally, or alternatively, a connected persistent web socket connection (e.g., Socket.io connection) can be authenticated using the aforementioned Daemon flow authentication architecture (e.g., architecture 1450) via RMS 110. In such embodiments, as described above, RAS 206 can create a socket connection to the RMS 110 which is authenticated as shown in FIG. 14B, described in greater detail below.

Taking a more granular look at FIG. 14A, recorders 1402 are shown to provide a public identifier (client_id) and a secret or password (client_secret) to a forward proxy 1404 (1). As described herein, forward proxy 1404 may be a component of recorders 1402 or API gateway component 106, or forward proxy 1404 is hosted by another computing device (e.g., another server). Alternatively, in FIG. 14B, forward proxy 1404 may be a component of RMS 110, as discussed below. Forward proxy 1404 is shown to transmit client_id and client_secret to authentication component 108 (2), where the public identifier and secret are authenticated using the aforementioned Daemon flow authentication. Subsequently, authentication component 108 may generate a Daemon flow access token (access_token), which is transmitted back to forward proxy 1404 (3). Authentication component 108 may also generate and transmit public keys for validating the access token to API gateway component 106 (5). As described herein, public keys and/or access tokens are cryptograms, often comprising strings of characters (e.g., numbers, letters, symbols), that are used for secure access and authentication of remote systems and devices.

As shown, API gateway component 106 may also receive access_token from forward proxy 1404 (4), either before, after, or concurrently with the public keys. Thus, once both the access_token and public keys are received, API gateway component 106 can validate the access_token to permit the API call. Once validated, API gateway component 106 may transmit data to notification API 112 (6). From there, notification API 112 can pass event data to managed streaming component 114. In some embodiments, event data includes application, linguistic, or acoustic events, as described in greater detail below. For example, recorders 1402 may obtain linguistic and acoustic data and may subsequently transmit the application, linguistic and acoustic data to notification API 112 via architecture 1400. In another example, recorders 1402 may detect linguistic and/or acoustic events or application events, such as during an audio (e.g., a phone call) between a customer and a support agent and/or customer interactions with an application running on the customer device and may transmit the detected event data to notification API 112 via architecture 1400.

Turning now to FIG. 14B, architecture 1450 is shown to be broadly similar to architecture 1400. For example, architecture 1450 includes recorders 1402, forward proxy 1404, and authentication component 108, which function as described above. In this regard, architecture 1450 may simply be an alternate configuration of architecture 1400. However, in the configuration of FIG. 14B, architecture 1450 is shown to pass access_token and public keys to RMS 110 rather than API gateway component 106. Accordingly, as mentioned above, architecture 1450 may represent an authentication architecture for persistent web socket connections (e.g., Socket.io). As shown, RMS 110 may communicate directly with managed streaming component 114 (6). In other words, the authentication is supplied by the connection interfacing directly to RMS 110, rather than using API gateway component 106. In general, web socket data can indicate a status of a current interaction for a user, such as a call state. This state data can be used in conjunction with the event data from notification API 112 (e.g., by managed streaming component 114) to generate a processed queue from the raw event queue. To this point, notification API 112 can provide specific event data (e.g., application or linguistic event data) as detected by recorders 1402.

Application Event Detection

As briefly mentioned above, application event data may be collected during, for example, a communication between a first user (e.g., a worker, such as a customer service representative or support agent) and a second user (e.g., a customer) and may be analyzed in real-time or near real-time (e.g., with a delay of less than one second) to detect application events, such as application opening and interaction by the first user or the second user during a monitored session, for example, audio and screen activity. In some embodiments, application event data is initially processed by recorders 1402, for example, and more specifically by real-time analytics framework 210. For example, recorders 1402 may collect application event data such as keystrokes, mouse clicks, screen touches, data submissions, etc in real-time or near real-time, over the course of a communication session between first and second users and may continuously process the application event data to detect application event events, as described below. When application events are detected, they may be enriched with contextual data from one or more other systems and/or data streams to generate contextualized notifications, as described above.

Application events associated with the first user or the second user such as agent activity, (application opening and interaction, audio and screen activity) or customer activity (application opening and interaction by the customer during a monitored session, audio and screen activity) may be recorded so that it can be evaluated according to business needs. For example, an agent may be provided prompts with helpful information, scripts, or other information upon detection that a certain form or application has been opened by the agent or the customer. For example, during a communication between a customer service representative and a customer, an agent may be provided with helpful information regarding a specific form that has been detected as having been opened on their desktop during the communication between the agent and the customer. It will be appreciated that the examples of application events provided herein are not intended to be limiting and that one of ordinary skill in the art would understand that numerous other application events may be detected, all of which are complemented by the present disclosure.

Figure 15:
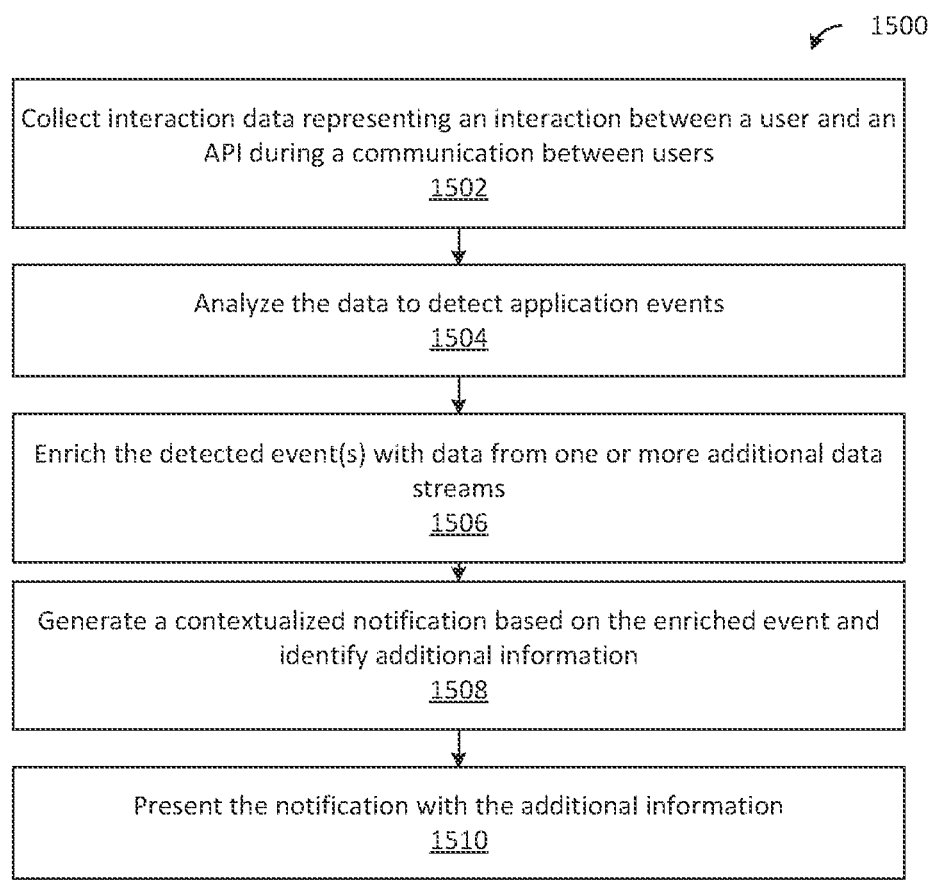
FIG. 15 is a flow diagram a process for detecting application events and providing corresponding notifications, according to certain embodiments.

Referring now to FIG. 15, a flow chart of a process 1500 for detecting application events and providing corresponding notifications is shown, according to certain embodiments. In particular, process 1500 may be implemented by system 100 in real-time or near real-time, such as during a communication between a support agent or other end user and a customer or other client. Advantageously, process 1500 produces additional information or enriched context that can aid the support agent/end user in evaluating and responding to customer needs due the communication. In some embodiments, one or more steps of process 1500 may be implemented by system 100, as described above. It will be appreciated that certain steps of process 1500 may be optional and, in some embodiments, process 1500 may be implemented using less than all of the steps.

At block 1502, application event data is collected over the course of a communication by recorders 1402. As mentioned above, the communication may be between a first user, such as a customer service agent, and a customer or other second user. In some embodiments, the audio data is collected by one or both of recorders 1402 (i.e., any of recorders 102/104/202), as described above. For example, recorders 1402 may collect (i.e., record) audio from the phone call in real-time. In some embodiments, the audio data is simultaneously stored in a database.

At block 1504, the application event data is analyzed (e.g., by recorders 1402) to detect events. In some embodiments, the application event data is analyzed in real-time throughout the communication (i.e., continuously). In other embodiments, the application event data is stored and analyzed at a later time (e.g., after the communication or within seconds of real-time). In some embodiments, analyzing the communication data first includes generating a transcript of the communication. For example, the application event data may be converted to text (i.e., transcribed) by recorders 1402 using any suitable speech-to-text methods or software. In some embodiments, the transcribed data is subsequently analyzed by real-time analytics framework 210 to detect application events, as described above. For example, real-time analytics framework 210 may scan the transcribed application event data to identify keystrokes, mouse clicks, screen touches, data submissions, etc. that provide context for the communication. In other embodiments, real-time analytics framework 210 itself implements machine learning techniques to identify application events within the keystrokes, mouse clicks, screen touches, data submissions, etc.

For example, in some embodiments, real-time analytics framework 210 implements a machine learning model, such as a neural network, to detect application events. For example, real-time analytics framework 210, or more broadly system 100, may include one or more recurrent neural networks (RNNs), convolutional neural networks (CNNs), transformers, or the like for detecting audio events. In some embodiments, a machine learning model is trained using previously-recorded (i.e., historic) data to improve the machine learning model's ability to detect application events. In some embodiments, the machine learning model is continuously or regularly modified/updated with new data. In other words, the machine learning model may continuously "learn" to identify events by processing user interaction data over time.

At block 1506, the detected event(s) are enriched (e.g., by managed streaming components 114) with data from one or more additional data streams. More generally, "enriching" the detected event(s) includes merging the event(s) with data from additional data streams, such as audio or contextual data. In some embodiments, data is merged at managed streaming component 114, as described above. For example, managed streaming component 114 may receive data from multiple different sources or may receive multiple different types of event messages (e.g., from recorders 1402) via notification API 112. In other words, managed streaming component 114 may receive and combine event messages, including one or more of application and/or audio events. Event messages may be combined (i.e., merged) based on a variety of different parameters, such as time of detection, event type, etc.

With reference to the authentication architectures described above and shown in FIGS. 14A and 14B, one such example of enriching application event data includes merging a detected event with web socket data indicating a state of an ongoing phone call. For example, as mentioned above, web socket data provided via RMS 110 can indicate a status of a phone call (e.g., whether the user is on a call or not, whether the call is ongoing or on hold, whether the call is currently being recorded or not, etc.). This web socket data, or other event data (e.g., application events, etc.) can then be combined with detected application events (e.g., from notification API 112) or other application events to provide a contextual "overview" of an ongoing phone call. In other words, combining application events with other contextual data can provide a more robust indication of the context for an ongoing phone call.

At block 1508, a notification (e.g., by Notification API 112) is generated based on the enriched event and additional prompts or data that may be helpful to the agent is provided. In some embodiments, the notification includes an indication of the detected event and the contextual data (e.g., data from additional streams) that was combined with the application event. In some embodiments, the notification includes prompts, forms, coaching, tips, suggestions, or other information for a user (e.g., a service agent). In particular, the notification may indicate a generalized event (e.g., "the customer is upset") or other information pertaining to a particular time period in the phone call based on the enriched application event. The notification may also provide optional response actions or additional information to the user to address the application event. For example, a notification indicating that a customer is threating to close an account may include a discount offer that the user can provide to the customer. Example notifications are discussed above with respect to FIGS. 8A and 8B.

In one example, a context-rich notification can be provided to a service agent if it is detected that a customer is providing sensitive information. Tying this example into the aforementioned blocks of process 1500, recorders 1402 or other client interface may detect an application opened by the user or information typed in or otherwise inputted to the application that indicates that the user is about to provide personal identifying information (PII). For example, the customer filling in a form with personal information may trigger an application event. This event may then be combined with contextual information, such as web socket data that indicates a state of the communication. For example, a communication state event may indicate that the communication or user interaction with an application is currently being recorded. Accordingly, at block 1508, a notification may be generated that warns the service agent to the communication recording and that recommends or coaches the service agent to pause the recording to protect the customer's PII (e.g., to prevent the PII from being recorded).

At block 1510, the notification, with additional helpful information, is presented to an end user via a user interface. In some embodiments, the notification is presented via a user interface of the user's device (e.g., a workstation associated with a service agent). For example, the notification may be displayed via CallMentoring screen 610, as discussed above. In general, notifications may be continuously generated and displayed (e.g., by continuously implementing process 1500) such that the user is regularly provided notifications based on the status of the phone call. For example, notifications may be presented at regular time intervals or every time a new event (e.g., audio or application based) is detected. As discussed below in greater detail, each notification may also have one or more interactive icons or "buttons" that the user can select to be provided with more information, to initiate response actions, etc. For example, a notification relating to a customer complaint may include an icon that, when selected by the user, escalates the customer complaint to a different service agent or department, such as by automatically transferring the call or transmitting a call log (i.e., a transcript of the call) to the different service agent or department.

In some embodiments, a graphical user interface is presented to a user of the client application discussed above. For example, an interface may display multiple notifications, similar to those discussed above with respect to FIGS. 8A and 8B. In some embodiments, interface is presented to a user (e.g., a service agent) during communication with a customer. For example, interface may provide live (i.e., real-time) notifications and coaching to the user throughout the communication.

In some embodiments, individual notifications of notifications that have been addressed (e.g., by the user), or that are no longer relevant, may be visually distinguished from active or current notifications. For example, notifications may be "greyed out." In other words, the visual appearance of notifications is modified, as compared to active notifications. In some embodiments, the visual appearance of notifications is altered based on an amount of time that has passed since the notification was presented. From another point of view, only the most recent of notifications is visually distinguished from the remaining notifications. For example, active notifications may be shown to be larger in size and may be a different color than notifications.

Configuration of Certain Embodiments

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for detecting application events during a communication between a first user and a second user, the system comprising:
   a memory comprising executable instructions;
   a processor configured to execute the executable instructions and cause the system to:

collect interaction data representing an interaction of the first user and the second user with an application protocol interface (API) during the communication;

analyze the interaction between the first user and the API to detect and identify an application event, wherein the application event is associated with a time of detection;

receive a stream of linguistic events determined from audio associated with the communication between the first user and the second user, wherein each linguistic event is associated with a time of detection;

enrich the identified application event with data from one or more additional streams comprising the stream of linguistic events by merging the identified application event with one or more linguistic events of the stream of linguistic events based on the associated times of detection;

generate a contextualized notification based on the enriched identified application event and identify additional information; and present the contextualized notification to the first user via a user interface.

2. The system of claim 1, wherein the executable instructions further cause the system to present the additional information to the first user.

3. The system of claim 1, wherein the additional information comprises prompts for the first user.

4. The system of claim 1, wherein the interaction data comprises keystrokes, mouse clicks, screen touches, or data submissions.

5. The system of claim 1, wherein the interaction data is analyzed in real-time or near real-time.

6. The system of claim 1, wherein the contextualized notification includes an indication of the application event and contextual data.

7. The system of claim 6, wherein the contextual data includes application event messages received from a remote device over a socket connection.

8. The system of claim 1, wherein the executable instructions further cause the system to authenticate application event messages using a token contained within a header prior to analyzing the interaction data.

9. The system of claim 1, wherein the executable instructions further cause the system to:
determine a current state of the communication based on the interaction data; and
continuously update a cache based on the current state of the communication, wherein the cache is updated to reflect a most recent application event.

10. The system of claim 1, wherein the contextualized notification includes at least one interactive icon, and the executable instructions further cause the system to:
receive a user input via the at least one interactive icon; and
initiate a response action responsive to the user input.

11. The system of claim 1, wherein the contextualized notification identifies each merged event and the additional information includes an action for the first user to perform during the interaction with the second user.

12. A non-transitory computer readable medium comprising instructions that, when executed by a processor of a processing system, cause the processing system to perform a method, the method comprising:
collecting interaction data representing an interaction of the first user and the second user with an application protocol interface (API) during a communication;

analyzing the interaction between the first user and the API to detect and identify an application event, wherein the application event is associated with a time of detection;

receiving a stream of linguistic events determined from audio associated with the communication between the first user and the second user, wherein each linguistic event is associated with a time of detection;

enriching the identified application event with data from one or more additional streams comprising the stream of linguistic events by merging the identified application event with one or more linguistic events of the stream of linguistic events based on the associated times of detection;

generating a contextualized notification based on the enriched identified application event and identify additional information; and presenting the contextualized notification to the first user via a user interface.

13. The non-transitory computer readable medium of claim 12, the executable instructions further cause the system to present the additional information to the first user.

14. The non-transitory computer readable medium of claim 12, wherein the additional information comprises prompts for the first user.

15. The non-transitory computer readable medium of claim 12, wherein the interaction data comprises keystrokes, mouse clicks, screen touches, or data submissions.

16. The non-transitory computer readable medium of claim 12, wherein the interaction data is analyzed in real-time or near real-time.

17. The non-transitory computer readable medium of claim 12, wherein the contextualized notification includes an indication of the application event and contextual data.

18. The non-transitory computer readable medium of claim 17, wherein the contextual data includes application event messages received from a remote device over a socket connection.

19. The non-transitory computer readable medium of claim 12, wherein the executable instructions further cause the system to authenticate application event messages using a token contained within a header prior to analyzing the interaction data.

20. The non-transitory computer readable medium of claim 12, wherein the executable instructions further cause the system to:
determine a current state of the communication based on the interaction data; and
continuously update a cache based on the current state of the communication, wherein the cache is updated to reflect a most recent application event.

21. The non-transitory computer readable medium of claim 12, wherein the notification includes at least one interactive icon and the executable instructions further cause the system to:
receiving a user input via the at least one interactive icon; and
initiating a response action responsive to the user input.

22. The non-transitory computer readable medium of claim 12, wherein the contextualized notification identifies each merged event and the additional information includes an action for the first user to perform during the interaction with the second user.

* * * * *